United States Patent
Oda

(10) Patent No.: US 12,268,571 B2
(45) Date of Patent: Apr. 8, 2025

(54) INDIRECT ORTHODONTIC BONDING SYSTEMS AND METHODS

(71) Applicant: Swift Health Systems Inc., Irvine, CA (US)

(72) Inventor: Todd Oda, Torrance, CA (US)

(73) Assignee: Swift Health Systems Inc., Irvine, CA (US)

( * ) Notice: Subject to any disclaimer, the term of this patent is extended or adjusted under 35 U.S.C. 154(b) by 0 days.

(21) Appl. No.: 17/690,515

(22) Filed: Mar. 9, 2022

(65) Prior Publication Data
US 2022/0287804 A1      Sep. 15, 2022

Related U.S. Application Data

(60) Provisional application No. 63/160,166, filed on Mar. 12, 2021.

(51) Int. Cl.
*A61C 7/02*     (2006.01)
*A61C 7/14*     (2006.01)

(52) U.S. Cl.
CPC ............. *A61C 7/146* (2013.01); *A61C 7/02* (2013.01)

(58) Field of Classification Search
CPC .. A61C 7/146; A61C 7/02; A61C 7/28; A61C 7/148; A61C 7/145; A61C 7/143; A61C 7/141; A61C 7/14; A61C 7/12
See application file for complete search history.

(56) References Cited

U.S. PATENT DOCUMENTS

| | | | |
|---|---|---|---|
| 1,005,131 | A | 10/1911 | Angle et al. |
| 1,108,493 | A | 8/1914 | Federspiel |
| 1,307,382 | A | 6/1919 | Stanton |
| 1,323,141 | A | 11/1919 | Young |
| 1,429,749 | A | 9/1922 | Maeulen et al. |
| 1,638,006 | A | 2/1926 | Aderer |
| 2,257,069 | A | 9/1941 | Peak |

(Continued)

FOREIGN PATENT DOCUMENTS

| | | |
|---|---|---|
| CN | 1372872 | 10/2002 |
| CN | 201079455 | 7/2008 |

(Continued)

OTHER PUBLICATIONS

IPhone 3D scanning to dental software, screen shots at 0:09 and 7:00 of YouTube video, https://www.youtube.com/watch?v=QONGdQ3QiFE, uploaded Oct. 1, 2018 in 2 pages.

(Continued)

*Primary Examiner* — Cris L. Rodriguez
*Assistant Examiner* — Luis Ruiz Martin
(74) *Attorney, Agent, or Firm* — Knobbe, Martens, Olson & Bear, LLP

(57) ABSTRACT

An indirect orthodontic bonding (IDB) tray preloaded with one or more orthodontic brackets with uncured pre-pasted adhesive. The loaded IDB tray can be produced by an IDB tray manufacturer and distributed to an orthodontist in a container that prevents the adhesive from curing. The loaded IDB tray can be removed from the container when the patient is ready for treatment. The loaded IDB tray can be placed over the dental arch of the patient such that the one or more orthodontic brackets can bond, via curing of the adhesive, to the teeth of the patient.

12 Claims, 9 Drawing Sheets

(56) References Cited

U.S. PATENT DOCUMENTS

| | | |
|---|---|---|
| 2,495,692 A | 1/1950 | Brusse |
| 2,524,763 A | 10/1950 | Brusse |
| 2,582,230 A | 1/1952 | Brusse |
| 3,256,602 A | 6/1966 | Broussard |
| 3,262,207 A | 7/1966 | Kesling |
| 3,374,542 A | 3/1968 | Moylan, Jr. |
| 3,464,113 A | 9/1969 | Silverman et al. |
| 3,593,421 A | 7/1971 | Brader |
| 3,600,808 A | 8/1971 | Reeve |
| 3,683,502 A | 8/1972 | Wallshein |
| 3,691,635 A | 9/1972 | Wallshein |
| 3,762,050 A | 10/1973 | Dal Pont |
| 3,765,091 A | 10/1973 | Northcutt |
| 3,878,610 A | 4/1975 | Coscina |
| 3,936,938 A | 2/1976 | Northcutt |
| 3,946,488 A | 3/1976 | Miller et al. |
| 3,949,477 A | 4/1976 | Cohen et al. |
| 3,975,823 A | 8/1976 | Sosnay |
| 4,103,423 A | 8/1978 | Kessel |
| 4,171,568 A | 10/1979 | Forster |
| 4,192,070 A | 3/1980 | Lemchen et al. |
| 4,193,195 A | 3/1980 | Merkel et al. |
| 4,197,643 A | 4/1980 | Burstone et al. |
| 4,268,250 A | 5/1981 | Reeve |
| 4,330,273 A | 5/1982 | Kesling |
| 4,354,833 A | 10/1982 | Fujita |
| 4,354,834 A | 10/1982 | Wilson |
| 4,382,781 A | 5/1983 | Grossman |
| 4,385,890 A | 5/1983 | Klein |
| 4,412,819 A | 11/1983 | Cannon |
| 4,424,033 A | 1/1984 | Wool |
| 4,436,510 A | 3/1984 | Klein |
| 4,479,779 A | 10/1984 | Wool |
| 4,483,674 A | 11/1984 | Schütz |
| 4,490,112 A | 12/1984 | Tanaka et al. |
| 4,501,554 A | 2/1985 | Hickham |
| 4,516,938 A | 5/1985 | Hall |
| 4,533,320 A | 8/1985 | Piekarsky |
| 4,561,844 A | 12/1985 | Bates |
| 4,580,976 A | 4/1986 | O'Meara |
| 4,582,487 A | 4/1986 | Creekmore |
| 4,585,414 A | 4/1986 | Kottermann |
| 4,592,725 A | 6/1986 | Goshgarian |
| 4,634,662 A | 1/1987 | Rosenberg |
| 4,656,860 A | 4/1987 | Orthuber et al. |
| 4,659,310 A | 4/1987 | Kottermann |
| 4,664,626 A | 5/1987 | Kesling |
| 4,674,978 A | 6/1987 | Acevedo |
| 4,676,747 A | 6/1987 | Kesling |
| 4,725,229 A | 2/1988 | Miller |
| 4,797,093 A | 1/1989 | Bergersen |
| 4,797,095 A | 1/1989 | Armstrong et al. |
| 4,838,787 A | 6/1989 | Lerner |
| 4,842,514 A | 6/1989 | Kesling |
| 4,872,449 A | 10/1989 | Beeuwkes |
| 4,881,896 A | 11/1989 | Bergersen |
| 4,892,479 A | 1/1990 | McKenna |
| 4,897,035 A | 1/1990 | Green |
| 4,900,251 A | 2/1990 | Andreasen |
| 4,978,323 A | 12/1990 | Freedman |
| 5,011,405 A | 4/1991 | Lemchen |
| 5,017,133 A | 5/1991 | Miura |
| 5,044,947 A | 9/1991 | Sachdeva et al. |
| 5,055,039 A | 10/1991 | Abbatte et al. |
| 5,092,768 A | 3/1992 | Korn |
| 5,114,339 A | 5/1992 | Guis |
| 5,123,838 A | 6/1992 | Cannon |
| 5,127,828 A | 7/1992 | Suyama |
| 5,131,843 A | 7/1992 | Hilgers et al. |
| 5,154,606 A | 10/1992 | Wildman |
| 5,174,754 A | 12/1992 | Meritt |
| 5,176,514 A | 1/1993 | Viazis |
| 5,176,618 A | 1/1993 | Freedman |
| 5,238,404 A | 8/1993 | Andreiko |
| 5,242,304 A | 9/1993 | Truax et al. |
| 5,248,257 A | 9/1993 | Cannon |
| 5,259,760 A | 11/1993 | Orikasa |
| 5,312,247 A | 5/1994 | Sachdeva et al. |
| 5,344,315 A | 9/1994 | Hanson |
| 5,368,478 A | 11/1994 | Andreiko |
| 5,380,197 A | 1/1995 | Hanson |
| 5,399,087 A | 3/1995 | Arndt |
| 5,431,562 A | 7/1995 | Andreiko |
| 5,447,432 A | 9/1995 | Andreiko |
| 5,454,717 A | 10/1995 | Andreiko |
| RE35,169 E | 3/1996 | Lemchen et al. |
| 5,516,284 A | 5/1996 | Wildman |
| 5,556,277 A | 9/1996 | Yawata et al. |
| 5,624,258 A | 4/1997 | Wool |
| 5,630,715 A | 5/1997 | Voudouris |
| 5,683,243 A | 11/1997 | Andreiko |
| 5,683,245 A | 11/1997 | Sachdeva et al. |
| 5,722,827 A | 3/1998 | Allesee |
| 5,727,941 A | 3/1998 | Kesling |
| 5,816,800 A | 10/1998 | Brehm |
| 5,820,370 A | 10/1998 | Brosius |
| 5,863,198 A | 1/1999 | Doyle |
| 5,890,893 A | 4/1999 | Heiser |
| 5,971,754 A | 10/1999 | Sondhi et al. |
| 5,975,893 A | 11/1999 | Chishti et al. |
| 5,993,208 A | 11/1999 | Jonjic |
| 6,015,289 A | 1/2000 | Andreiko |
| 6,036,489 A | 3/2000 | Brosius |
| 6,042,374 A | 3/2000 | Farzin-Nia et al. |
| 6,086,364 A | 7/2000 | Brunson |
| 6,089,861 A | 7/2000 | Kelly |
| 6,095,809 A | 8/2000 | Kelly et al. |
| 6,099,304 A | 8/2000 | Carter |
| 6,123,544 A | 9/2000 | Cleary |
| 6,183,250 B1 | 2/2001 | Kanno et al. |
| 6,190,166 B1 | 2/2001 | Sasakura |
| 6,196,839 B1 | 3/2001 | Ross |
| 6,213,767 B1 | 4/2001 | Dixon et al. |
| 6,217,325 B1 | 4/2001 | Chishti et al. |
| 6,227,850 B1 | 5/2001 | Chishti et al. |
| 6,244,861 B1 | 6/2001 | Andreiko |
| 6,250,918 B1 | 6/2001 | Sachdeva et al. |
| 6,258,118 B1 | 7/2001 | Baum et al. |
| 6,315,553 B1 | 11/2001 | Sachdeva et al. |
| 6,318,994 B1 | 11/2001 | Chishti et al. |
| 6,318,995 B1 | 11/2001 | Sachdeva et al. |
| 6,334,853 B1 | 1/2002 | Kopelman et al. |
| 6,350,120 B1 | 2/2002 | Sachdeva et al. |
| 6,358,045 B1 | 3/2002 | Farzin-Nia et al. |
| 6,371,761 B1 | 4/2002 | Cheang et al. |
| 6,375,458 B1 | 4/2002 | Moorleghem et al. |
| 6,394,801 B2 | 5/2002 | Chishti et al. |
| 6,398,548 B1 | 6/2002 | Muhammad et al. |
| 6,413,084 B1 | 6/2002 | Rubbert et al. |
| 6,431,870 B1 | 8/2002 | Sachdeva |
| 6,450,807 B1 | 9/2002 | Chishti et al. |
| 6,464,495 B1 | 10/2002 | Voudouris |
| 6,464,496 B1 | 10/2002 | Sachdeva et al. |
| 6,471,511 B1 | 10/2002 | Chishti et al. |
| 6,471,512 B1 | 10/2002 | Sachdeva et al. |
| 6,512,994 B1 | 1/2003 | Sachdeva |
| 6,514,074 B1 | 2/2003 | Chishti et al. |
| 6,532,299 B1 | 3/2003 | Sachdeva et al. |
| 6,540,512 B1 | 4/2003 | Sachdeva et al. |
| 6,554,613 B1 | 4/2003 | Sachdeva et al. |
| 6,572,693 B1 | 6/2003 | Wu et al. |
| 6,582,226 B2 | 6/2003 | Jordan et al. |
| 6,587,828 B1 | 7/2003 | Sachdeva |
| 6,595,774 B1 | 7/2003 | Risse |
| 6,554,611 B2 | 8/2003 | Chishti et al. |
| 6,602,070 B2 | 8/2003 | Miller et al. |
| 6,612,143 B1 | 9/2003 | Butscher et al. |
| 6,616,444 B2 | 9/2003 | Andreiko |
| 6,626,666 B2 | 9/2003 | Chishti et al. |
| 6,629,840 B2 | 10/2003 | Chishti et al. |
| 6,632,089 B2 | 10/2003 | Rubbert |
| 6,648,640 B2 | 11/2003 | Rubbert |
| 6,663,385 B2 | 12/2003 | Tepper |
| 6,679,700 B2 | 1/2004 | McGann |

(56) References Cited

U.S. PATENT DOCUMENTS

| | | |
|---|---|---|
| 6,682,344 B1 | 1/2004 | Stockstill |
| 6,685,469 B2 | 2/2004 | Chishti et al. |
| 6,685,470 B2 | 2/2004 | Chishti et al. |
| 6,688,885 B1 | 2/2004 | Sachdeva et al. |
| 6,699,037 B2 | 3/2004 | Chishti et al. |
| 6,702,575 B2 | 3/2004 | Hilliard |
| 6,705,863 B2 | 3/2004 | Phan et al. |
| 6,722,878 B2 | 4/2004 | Graham |
| 6,722,880 B2 | 4/2004 | Chishti et al. |
| 6,728,423 B1 | 4/2004 | Rubbert et al. |
| 6,729,876 B2 | 5/2004 | Chishti et al. |
| 6,732,558 B2 | 5/2004 | Butscher et al. |
| 6,733,285 B2 | 5/2004 | Puttler et al. |
| 6,733,287 B2 | 5/2004 | Wilkerson |
| 6,733,288 B2 | 5/2004 | Vallittu et al. |
| 6,736,638 B1 | 5/2004 | Sachdeva et al. |
| 6,738,508 B1 | 5/2004 | Rubbert et al. |
| 6,739,869 B1 | 5/2004 | Taub et al. |
| 6,744,914 B1 | 6/2004 | Rubbert et al. |
| 6,744,932 B1 | 6/2004 | Rubbert et al. |
| 6,746,241 B2 | 6/2004 | Townsend-Hansen |
| 6,755,064 B2 | 6/2004 | Butscher |
| 6,771,809 B1 | 8/2004 | Rubbert et al. |
| 6,776,614 B2 | 8/2004 | Wiechmann |
| 6,811,397 B2 | 11/2004 | Wool |
| 6,830,450 B2 | 12/2004 | Knopp et al. |
| 6,845,175 B2 | 1/2005 | Kopelman et al. |
| 6,846,179 B2 | 1/2005 | Chapouland |
| 6,851,949 B1 | 2/2005 | Sachdeva et al. |
| 6,860,132 B2 | 3/2005 | Butscher |
| 6,893,257 B2 | 5/2005 | Kelly |
| 6,928,733 B2 | 8/2005 | Rubbert et al. |
| 6,948,931 B2 | 9/2005 | Chishti et al. |
| 6,960,079 B2 | 11/2005 | Brennan et al. |
| 6,971,873 B2 | 12/2005 | Sachdeva |
| 6,976,627 B1 | 12/2005 | Culp et al. |
| 6,988,889 B2 | 1/2006 | Abels |
| 6,996,452 B2 | 2/2006 | Erichsen et al. |
| 7,008,221 B2 | 3/2006 | McGann |
| 7,013,191 B2 | 3/2006 | Rubbert |
| 7,020,963 B2 | 4/2006 | Cleary et al. |
| 7,029,275 B2 | 4/2006 | Rubbert |
| 7,033,171 B2 | 4/2006 | Wilkerson |
| 7,037,107 B2 | 5/2006 | Yamamoto |
| 7,056,115 B2 | 6/2006 | Phan et al. |
| 7,063,531 B2 | 6/2006 | Maijer et al. |
| 7,068,836 B1 | 6/2006 | Rubbert et al. |
| 7,076,980 B2 | 7/2006 | Butscher |
| 7,077,646 B2 | 7/2006 | Hilliard |
| 7,077,647 B2 | 7/2006 | Choi et al. |
| 7,080,979 B2 | 7/2006 | Rubbert et al. |
| 7,092,107 B2 | 8/2006 | Babayoff et al. |
| 7,094,053 B2 | 8/2006 | Andreiko |
| 7,112,065 B2 | 9/2006 | Kopelman et al. |
| 7,125,248 B2 | 10/2006 | Phan et al. |
| 7,134,874 B2 | 11/2006 | Chishti et al. |
| 7,137,812 B2 | 11/2006 | Cleary et al. |
| 7,155,373 B2 | 12/2006 | Jordan et al. |
| 7,156,661 B2 | 1/2007 | Choi et al. |
| 7,160,110 B2 | 1/2007 | Imgrund et al. |
| 7,168,950 B2 | 1/2007 | Cinader, Jr. et al. |
| 7,172,417 B2 | 2/2007 | Sporbert et al. |
| 7,175,428 B2 | 2/2007 | Nicholson |
| 7,186,115 B2 | 3/2007 | Goldberg et al. |
| 7,188,421 B2 | 3/2007 | Cleary et al. |
| 7,201,574 B1 | 4/2007 | Wiley |
| 7,204,690 B2 | 4/2007 | Hanson et al. |
| 7,214,056 B2 | 5/2007 | Stockstill |
| 7,229,282 B2 | 6/2007 | Andreiko |
| 7,234,934 B2 | 6/2007 | Rosenberg |
| 7,234,936 B2 | 6/2007 | Lai |
| 7,234,937 B2 | 6/2007 | Sachdeva et al. |
| 7,240,528 B2 | 7/2007 | Weise et al. |
| 7,244,121 B2 | 7/2007 | Brosius |
| 7,245,977 B1 | 7/2007 | Simkins |
| 7,252,506 B2 | 8/2007 | Lai |
| 7,267,545 B2 | 9/2007 | Oda |
| 7,283,891 B2 | 10/2007 | Butscher |
| 7,296,996 B2 | 11/2007 | Sachdeva |
| 7,335,021 B2 | 2/2008 | Nikodem |
| 7,347,688 B2 | 3/2008 | Kopelman et al. |
| 7,354,268 B2 | 4/2008 | Raby et al. |
| 7,357,634 B2 | 4/2008 | Knopp |
| 7,361,017 B2 | 4/2008 | Sachdeva |
| 7,364,428 B2 | 4/2008 | Cinader, Jr. et al. |
| 7,404,714 B2 | 7/2008 | Cleary et al. |
| 7,410,357 B2 | 8/2008 | Cleary et al. |
| 7,416,408 B2 | 8/2008 | Farzin-Nia et al. |
| 7,442,041 B2 | 10/2008 | Imgrund et al. |
| 7,452,205 B2 | 11/2008 | Cinader, Jr. et al. |
| 7,458,812 B2 | 12/2008 | Sporbert et al. |
| 7,469,783 B2 | 12/2008 | Rose, Sr. |
| 7,471,821 B2 | 12/2008 | Rubbert et al. |
| 7,473,097 B2 | 1/2009 | Raby et al. |
| 7,556,496 B2 | 7/2009 | Cinader, Jr. et al. |
| 7,578,673 B2 | 8/2009 | Wen et al. |
| 7,578,674 B2 | 8/2009 | Chishti et al. |
| 7,585,172 B2 | 9/2009 | Rubbert |
| 7,590,462 B2 | 9/2009 | Rubbert |
| 7,604,181 B2 | 10/2009 | Culp et al. |
| 7,621,743 B2 | 11/2009 | Bathen |
| 7,641,473 B2 | 1/2010 | Sporbert |
| 7,674,110 B2 | 3/2010 | Oda |
| 7,677,887 B2 | 3/2010 | Nicholson |
| 7,699,606 B2 | 4/2010 | Sachdeva et al. |
| 7,704,072 B2 | 4/2010 | Damon |
| 7,717,708 B2 | 5/2010 | Sachdeva |
| 7,722,354 B1 | 5/2010 | Dumas |
| 7,726,470 B2 | 6/2010 | Cinader, Jr. et al. |
| 7,726,968 B2 | 6/2010 | Raby et al. |
| 7,751,925 B2 | 7/2010 | Rubbert |
| 7,762,815 B2 | 7/2010 | Cinader, Jr. et al. |
| 7,811,087 B2 | 10/2010 | Wiechmann |
| 7,837,464 B2 | 11/2010 | Marshall |
| 7,837,466 B2 | 11/2010 | Griffith et al. |
| 7,837,467 B2 | 11/2010 | Butscher |
| 7,845,938 B2 | 12/2010 | Kim et al. |
| 7,850,451 B2 | 12/2010 | Wiechmann |
| 7,871,267 B2 | 1/2011 | Griffith et al. |
| 7,878,806 B2 | 2/2011 | Lemchen |
| 7,909,603 B2 | 3/2011 | Oda |
| D636,084 S | 4/2011 | Troester |
| D636,085 S | 4/2011 | Troester |
| 7,950,131 B2 | 5/2011 | Hilliard |
| 7,993,133 B2 | 8/2011 | Cinader, Jr. et al. |
| 8,021,146 B2 | 9/2011 | Cinader, Jr. et al. |
| 8,029,275 B2 | 10/2011 | Kesling |
| 8,033,824 B2 | 10/2011 | Oda et al. |
| 8,038,444 B2 | 10/2011 | Kitching et al. |
| 8,047,034 B2 | 11/2011 | Butscher |
| 8,057,226 B2 | 11/2011 | Wiechmann |
| 8,070,487 B2 | 12/2011 | Chishti et al. |
| 8,082,769 B2 | 12/2011 | Butscher |
| 8,092,215 B2 | 1/2012 | Stone-collonge et al. |
| 8,102,538 B2 | 1/2012 | Babayoff |
| 8,113,828 B1 | 2/2012 | Greenfield |
| 8,113,829 B2 | 2/2012 | Sachdeva |
| 8,114,327 B2 | 2/2012 | Cinader, Jr. et al. |
| 8,121,718 B2 | 2/2012 | Rubbert |
| 8,142,187 B2 | 3/2012 | Sporbert |
| 8,152,519 B1 | 4/2012 | Dumas et al. |
| 8,177,551 B2 | 5/2012 | Sachdeva et al. |
| 8,192,196 B2 | 6/2012 | Singh |
| 8,192,197 B2 | 6/2012 | Sporbert |
| 8,194,067 B2 | 6/2012 | Raby |
| 8,220,195 B2 | 7/2012 | Maijer et al. |
| 8,251,699 B2 | 8/2012 | Reising et al. |
| 8,266,940 B2 | 9/2012 | Riemeir et al. |
| 8,297,970 B2 | 10/2012 | Kanomi |
| 8,308,478 B2 * | 11/2012 | Primus ............ A61C 7/16 433/24 |
| 8,313,327 B1 | 11/2012 | Won |
| 8,359,115 B2 | 1/2013 | Kopelman et al. |
| 8,363,228 B2 | 1/2013 | Babayoff |

(56) References Cited

U.S. PATENT DOCUMENTS

| | | |
|---|---|---|
| 8,366,440 B2 | 2/2013 | Bathen |
| 8,376,739 B2 | 2/2013 | Dupray |
| 8,382,917 B2 | 2/2013 | Johnson |
| 8,393,896 B2 | 3/2013 | Oda |
| 8,417,366 B2 | 4/2013 | Getto |
| 8,439,671 B2 | 5/2013 | Cinader, Jr. |
| 8,439,672 B2 | 5/2013 | Matov et al. |
| 8,451,456 B2 | 5/2013 | Babayoff |
| 8,454,364 B2 | 6/2013 | Taub et al. |
| 8,459,988 B2 | 6/2013 | Dumas |
| 8,465,279 B2 | 6/2013 | Bathen |
| 8,469,704 B2 | 6/2013 | Oda et al. |
| 8,479,393 B2 | 7/2013 | Abels et al. |
| 8,485,816 B2 | 7/2013 | Macchi |
| 8,491,306 B2 | 7/2013 | Raby et al. |
| D688,803 S | 8/2013 | Gilbert |
| 8,500,445 B2 | 8/2013 | Borri |
| 8,517,727 B2 | 8/2013 | Raby et al. |
| 8,545,221 B2 | 10/2013 | Sonte-collenge et al. |
| 8,550,814 B1 | 10/2013 | Collins |
| 8,562,337 B2 | 10/2013 | Kuo et al. |
| 8,573,972 B2 | 11/2013 | Matov et al. |
| 8,591,225 B2 | 11/2013 | Wu et al. |
| 8,591,226 B2 | 11/2013 | Griffith et al. |
| 8,636,505 B2 | 1/2014 | Fornoff |
| 8,638,447 B2 | 1/2014 | Babayoff et al. |
| 8,638,448 B2 | 1/2014 | Babayoff et al. |
| 8,675,207 B2 | 3/2014 | Babayoff |
| 8,678,818 B2 | 3/2014 | Dupray |
| 8,690,568 B2 | 4/2014 | Chapouland |
| 8,708,697 B2 | 4/2014 | Li et al. |
| 8,714,972 B2 | 5/2014 | Eichenberg |
| 8,734,149 B2 | 5/2014 | Phan et al. |
| 8,734,690 B2 | 5/2014 | Komori |
| 8,780,106 B2 | 7/2014 | Chishti et al. |
| 8,805,048 B2 | 8/2014 | Batesole |
| 8,805,563 B2 | 8/2014 | Kopelman et al. |
| 8,807,995 B2 | 8/2014 | Kabbani et al. |
| 8,827,697 B2 | 9/2014 | Cinader, Jr. et al. |
| 8,845,330 B2 | 9/2014 | Taub et al. |
| 8,871,132 B2 | 10/2014 | Abels et al. |
| 8,931,171 B2 | 1/2015 | Rosenberg |
| 8,932,054 B1 | 1/2015 | Rosenberg |
| 8,936,464 B2 | 1/2015 | Kopelman |
| 8,961,172 B2 | 2/2015 | Dupray |
| 8,968,365 B2 | 3/2015 | Aschmann et al. |
| 8,979,528 B2 | 3/2015 | Macchi |
| 8,986,004 B2 | 3/2015 | Dumas |
| 8,992,215 B2 | 3/2015 | Chapouland |
| 8,998,608 B2 | 4/2015 | Imgrund et al. |
| 9,022,781 B2 | 5/2015 | Kuo et al. |
| D731,659 S | 6/2015 | Singh |
| 9,066,775 B2 | 6/2015 | Bukhary |
| 9,089,386 B2 | 7/2015 | Hagelganz |
| D736,945 S | 8/2015 | Singh |
| 9,101,433 B2 | 8/2015 | Babayoff |
| 9,119,689 B2 | 9/2015 | Kabbani |
| 9,127,338 B2 | 9/2015 | Johnson |
| 9,144,473 B2 | 9/2015 | Aldo |
| 9,161,823 B2 | 10/2015 | Morton et al. |
| 9,204,942 B2 | 12/2015 | Phan et al. |
| 9,299,192 B2 | 3/2016 | Kopelman |
| 9,301,815 B2 | 4/2016 | Dumas |
| 9,329,675 B2 | 5/2016 | Ojelund et al. |
| 9,339,352 B2 | 5/2016 | Cinader et al. |
| 9,387,055 B2 | 7/2016 | Cinader, Jr. et al. |
| 9,402,695 B2 | 8/2016 | Curiel et al. |
| 9,427,291 B2 | 8/2016 | Khoshnevis et al. |
| 9,427,916 B2 | 8/2016 | Taub et al. |
| 9,433,477 B2 | 9/2016 | Borovinskih et al. |
| 9,439,737 B2 | 9/2016 | Gonzales et al. |
| 9,451,873 B1 | 9/2016 | Kopelman et al. |
| 9,492,246 B2 | 11/2016 | Lin |
| 9,498,302 B1 | 11/2016 | Patel |
| D774,193 S | 12/2016 | Makmel et al. |
| 9,510,757 B2 | 12/2016 | Kopelman et al. |
| 9,517,112 B2 | 12/2016 | Hagelganz et al. |
| 9,529,970 B2 | 12/2016 | Andreiko |
| 9,532,854 B2 | 1/2017 | Cinader et al. |
| 9,539,064 B2 | 1/2017 | Abels et al. |
| 9,554,875 B2 | 1/2017 | Gualano |
| 9,566,132 B2 | 2/2017 | Stone-collonge et al. |
| 9,566,134 B2 | 2/2017 | Hagelganz et al. |
| 9,585,733 B2 | 3/2017 | Voudouris |
| 9,585,734 B2 | 3/2017 | Lai et al. |
| 9,597,165 B2 | 3/2017 | Kopelman |
| 9,610,628 B2 | 4/2017 | Riemeier |
| 9,615,901 B2 | 4/2017 | Babayoff et al. |
| 9,622,834 B2 | 4/2017 | Chapouland |
| 9,622,835 B2 | 4/2017 | See et al. |
| 9,629,551 B2 | 4/2017 | Fisker et al. |
| 9,629,694 B2 | 4/2017 | Chun et al. |
| 9,642,678 B2 | 5/2017 | Kuo |
| 9,675,435 B2 | 6/2017 | Karazivan et al. |
| 9,707,056 B2 | 7/2017 | Machata et al. |
| 9,763,750 B2 | 9/2017 | Kim et al. |
| 9,788,917 B2 | 10/2017 | Mah |
| 9,814,543 B2 | 11/2017 | Huang et al. |
| 9,844,420 B2 | 12/2017 | Cheang |
| 9,848,958 B2 | 12/2017 | Matov et al. |
| 9,867,678 B2 | 1/2018 | Macchi |
| 9,867,680 B2 | 1/2018 | Damon |
| 9,872,741 B2 | 1/2018 | Gualano |
| 9,877,804 B2 | 1/2018 | Chester |
| 9,877,805 B2 | 1/2018 | Abels et al. |
| 9,925,020 B2 | 3/2018 | Jo |
| 9,937,018 B2 | 4/2018 | Martz et al. |
| 9,937,020 B2 | 4/2018 | Choi |
| 9,956,058 B2 | 5/2018 | Kopelman |
| 9,962,244 B2 | 5/2018 | Esbech et al. |
| 9,975,294 B2 | 5/2018 | Taub et al. |
| 9,987,105 B2 | 6/2018 | Dupray |
| 10,028,804 B2 | 7/2018 | Schulhof et al. |
| 10,045,834 B2 | 8/2018 | Gualano |
| 10,052,177 B2 | 8/2018 | Andreiko |
| 10,058,400 B2 | 8/2018 | Abels et al. |
| 10,058,401 B2 | 8/2018 | Tan |
| 10,064,706 B2 | 9/2018 | Dickerson |
| 10,070,943 B2 | 9/2018 | Fornoff |
| 10,076,780 B2 | 9/2018 | Riemeier et al. |
| 10,098,709 B1 | 10/2018 | Kitching et al. |
| 10,130,987 B2 | 11/2018 | Riemeier et al. |
| 10,136,966 B2 | 11/2018 | Reybrouck et al. |
| 10,149,738 B2 | 12/2018 | Lee |
| 10,179,035 B2 | 1/2019 | Shivapuja et al. |
| 10,179,036 B2 | 1/2019 | Lee |
| 10,219,877 B2 | 3/2019 | Khoshnevis et al. |
| 10,226,312 B2 | 3/2019 | Khoshnevis et al. |
| 10,238,476 B2 | 3/2019 | Karazivan et al. |
| 10,241,499 B1 | 3/2019 | Griffin |
| 10,278,791 B2 | 5/2019 | Schumacher |
| 10,278,792 B2 | 5/2019 | Wool |
| 10,278,793 B2 | 5/2019 | Gonzalez et al. |
| 10,292,789 B2 | 5/2019 | Martz et al. |
| 10,307,221 B2 | 6/2019 | Cinader, Jr. |
| 10,314,673 B2 | 6/2019 | Schulhof et al. |
| 10,327,867 B2 | 6/2019 | Nikolskiy et al. |
| 10,342,640 B2 | 7/2019 | Cassalia |
| 10,368,961 B2 | 8/2019 | Paehl et al. |
| 10,383,707 B2 | 8/2019 | Roein Peikar et al. |
| D859,663 S | 9/2019 | Cetta et al. |
| 10,413,386 B2 | 9/2019 | Moon et al. |
| 10,426,575 B1 | 10/2019 | Raslambekov |
| 10,456,228 B2 | 10/2019 | Karazivan et al. |
| 10,478,271 B2 | 11/2019 | Patel |
| 10,485,638 B2 | 11/2019 | Salah |
| 10,492,889 B2 | 12/2019 | Kim et al. |
| 10,492,890 B2 | 12/2019 | Cinader, Jr. et al. |
| 10,555,792 B2 | 2/2020 | Kopelman et al. |
| 10,588,717 B2 | 3/2020 | Chun et al. |
| 10,595,966 B2 | 3/2020 | Carrier, Jr. et al. |
| 10,596,717 B2 | 3/2020 | Hashish et al. |
| 10,603,137 B2 | 3/2020 | Alauddin et al. |
| 10,636,522 B2 | 4/2020 | Katzman et al. |

(56) References Cited

U.S. PATENT DOCUMENTS

| | | |
|---|---|---|
| 10,639,130 B2 | 5/2020 | Blees et al. |
| 10,639,134 B2 | 5/2020 | Shangjani et al. |
| 10,717,208 B1 | 7/2020 | Raslambekov et al. |
| 10,754,325 B1 | 8/2020 | Griffin, III |
| 10,758,323 B2 | 9/2020 | Kopelman |
| 10,772,706 B2 | 9/2020 | Schumacher |
| 10,806,376 B2 | 10/2020 | Lotan et al. |
| 10,809,697 B2 | 10/2020 | Grapsas |
| 10,828,133 B2 | 11/2020 | Tong et al. |
| 10,849,723 B1 | 12/2020 | Yancey et al. |
| 10,869,738 B2 | 12/2020 | Witte et al. |
| 10,881,488 B2 | 1/2021 | Kopelman |
| 10,881,489 B2 | 1/2021 | Tong et al. |
| 10,905,527 B2 | 2/2021 | Roein Peikar et al. |
| 10,932,887 B2 | 3/2021 | Hung |
| 10,935,958 B2 | 3/2021 | Sirovskiy et al. |
| 10,952,820 B2 | 3/2021 | Song et al. |
| 10,980,614 B2 | 4/2021 | Roein Peikar et al. |
| 10,984,549 B2 | 4/2021 | Goncharov et al. |
| 10,993,782 B1 | 5/2021 | Raslambekov |
| 10,993,785 B2 | 5/2021 | Roein Peikar et al. |
| 10,996,813 B2 | 5/2021 | Makarenkova et al. |
| 11,020,205 B2 | 6/2021 | Li et al. |
| 11,045,281 B2 | 6/2021 | Tsai et al. |
| 11,045,295 B2 | 6/2021 | Karazivan et al. |
| 11,058,517 B2 | 7/2021 | Tong et al. |
| 11,058,518 B2 | 7/2021 | Roein Peikar et al. |
| 11,058,520 B2 | 7/2021 | Khoshnevis et al. |
| 11,072,021 B2 | 7/2021 | Riemeier et al. |
| 11,083,411 B2 | 8/2021 | Yancey et al. |
| 11,083,546 B2 | 8/2021 | Cassalia |
| 11,103,330 B2 | 8/2021 | Webber et al. |
| 11,129,696 B2 | 9/2021 | Khoshnevis et al. |
| 11,147,652 B2 | 10/2021 | Mason et al. |
| 11,154,382 B2 | 10/2021 | Kopelman et al. |
| 11,229,505 B2 | 1/2022 | Schumacher et al. |
| 11,234,794 B2 | 2/2022 | Pokotilov et al. |
| 11,304,781 B2 | 4/2022 | Chun et al. |
| 11,317,994 B2 | 5/2022 | Peikar et al. |
| 11,317,995 B2 | 5/2022 | Peikar et al. |
| 11,324,572 B2 | 5/2022 | Peikar et al. |
| 11,331,165 B2 | 5/2022 | Owen |
| 11,337,486 B2 | 5/2022 | Oda et al. |
| 11,357,598 B2 | 6/2022 | Cramer |
| 11,382,720 B2 | 7/2022 | Kopelman et al. |
| 11,413,117 B2 | 8/2022 | Griffin, III et al. |
| 11,419,701 B2 | 8/2022 | Shanjani et al. |
| 11,433,658 B2 | 9/2022 | Friedrich et al. |
| 11,435,142 B2 | 9/2022 | Hauptmann |
| 11,446,117 B2 | 9/2022 | Paehl et al. |
| 11,446,219 B2 | 9/2022 | Kohler et al. |
| 11,464,604 B2 | 10/2022 | Makarenkova et al. |
| 11,471,254 B2 | 10/2022 | Owen |
| 11,471,255 B2 | 10/2022 | Cinader, Jr. et al. |
| 11,478,335 B2 | 10/2022 | Lai et al. |
| 11,478,337 B2 | 10/2022 | Griffin, III et al. |
| 11,490,995 B2 | 11/2022 | Wratten, Jr. et al. |
| 11,500,354 B2 | 11/2022 | Griffin, III et al. |
| 11,504,212 B2 | 11/2022 | Wratten, Jr. et al. |
| 11,510,757 B2 | 11/2022 | Khoshnevis et al. |
| 11,510,758 B2 | 11/2022 | Khoshnevis et al. |
| D972,732 S | 12/2022 | Villanueva |
| 11,517,405 B2 | 12/2022 | Khoshnevis et al. |
| 11,612,458 B1 | 3/2023 | Tong et al. |
| 11,612,459 B2 | 3/2023 | Tong et al. |
| 11,696,816 B2 | 7/2023 | Gardner |
| 11,911,971 B2 | 2/2024 | Tong et al. |
| 2001/0055741 A1 | 12/2001 | Dixon et al. |
| 2002/0006597 A1 | 1/2002 | Andreiko et al. |
| 2002/0010568 A1 | 1/2002 | Rubbert et al. |
| 2002/0081546 A1 | 6/2002 | Tricca et al. |
| 2002/0098460 A1 | 7/2002 | Farzin-Nia |
| 2002/0192617 A1 | 12/2002 | Phan et al. |
| 2003/0049582 A1 | 3/2003 | Abels et al. |
| 2003/0070468 A1 | 4/2003 | Butscher et al. |
| 2003/0180689 A1 | 9/2003 | Arx et al. |
| 2003/0194677 A1 | 10/2003 | Sachdeva et al. |
| 2003/0207224 A1 | 11/2003 | Lotte |
| 2004/0048222 A1 | 3/2004 | Forster et al. |
| 2004/0072120 A1 | 4/2004 | Lauren |
| 2004/0083611 A1 | 5/2004 | Rubbert et al. |
| 2004/0161722 A1 | 8/2004 | Lai et al. |
| 2004/0166459 A1 | 8/2004 | Voudouris |
| 2004/0168752 A1 | 9/2004 | Julien |
| 2004/0199177 A1 | 10/2004 | Kim |
| 2004/0219471 A1 | 11/2004 | Cleary et al. |
| 2005/0043837 A1 | 2/2005 | Rubbert et al. |
| 2005/0074716 A1 | 4/2005 | Cleary et al. |
| 2005/0106529 A1 | 5/2005 | Abolfathi et al. |
| 2005/0181332 A1 | 8/2005 | Sernetz |
| 2005/0191592 A1 | 9/2005 | Farzin-Nia et al. |
| 2005/0233276 A1 | 10/2005 | Kopelman et al. |
| 2005/0244780 A1 | 11/2005 | Abels et al. |
| 2005/0244781 A1 | 11/2005 | Abels et al. |
| 2005/0244790 A1 | 11/2005 | Kuperman |
| 2006/0006092 A1 | 1/2006 | DuBos |
| 2006/0014116 A1 | 1/2006 | Maijer et al. |
| 2006/0068354 A1 | 3/2006 | Jeckel |
| 2006/0127834 A1* | 6/2006 | Szwajkowski ......... A61C 7/146 206/63.5 |
| 2006/0175209 A1 | 8/2006 | Sabilla et al. |
| 2006/0223021 A1 | 10/2006 | Cinader et al. |
| 2006/0223031 A1 | 10/2006 | Cinader, Jr. et al. |
| 2006/0257813 A1 | 11/2006 | Highland |
| 2006/0257821 A1 | 11/2006 | Cinader, Jr. et al. |
| 2007/0015103 A1 | 1/2007 | Sorel |
| 2007/0031773 A1 | 2/2007 | Scuzzo |
| 2007/0031775 A1 | 2/2007 | Andreiko |
| 2007/0087302 A1 | 4/2007 | Reising et al. |
| 2007/0107745 A1 | 5/2007 | Kiyomoto |
| 2007/0111154 A1 | 5/2007 | Sampermans |
| 2007/0118215 A1 | 5/2007 | Moaddeb |
| 2007/0134611 A1 | 6/2007 | Nicholson |
| 2007/0134612 A1 | 6/2007 | Contencin |
| 2007/0141525 A1 | 6/2007 | Cinader, Jr. |
| 2007/0154859 A1 | 7/2007 | Hilliard |
| 2007/0172788 A1 | 7/2007 | Hill, II et al. |
| 2007/0190478 A1 | 8/2007 | Goldberg et al. |
| 2007/0231768 A1 | 10/2007 | Hutchinson |
| 2007/0235051 A1 | 10/2007 | Robinson |
| 2007/0287121 A1 | 12/2007 | Cinader et al. |
| 2008/0032250 A1 | 2/2008 | Kopelman et al. |
| 2008/0057460 A1 | 3/2008 | Hicks |
| 2008/0063995 A1 | 3/2008 | Farzin-Nia et al. |
| 2008/0131831 A1 | 6/2008 | Abels et al. |
| 2008/0160475 A1 | 7/2008 | Rojas-Pardini |
| 2008/0199825 A1 | 8/2008 | Jahn |
| 2008/0227049 A1 | 9/2008 | Sevinc |
| 2008/0233528 A1 | 9/2008 | Kim et al. |
| 2008/0233530 A1 | 9/2008 | Cinader |
| 2008/0233531 A1 | 9/2008 | Raby et al. |
| 2008/0248439 A1 | 10/2008 | Griffith et al. |
| 2008/0254403 A1 | 10/2008 | Hilliard |
| 2008/0268398 A1 | 10/2008 | Cantarella |
| 2008/0286711 A1 | 11/2008 | Corcoran et al. |
| 2008/0305450 A1 | 12/2008 | Steen |
| 2009/0004619 A1 | 1/2009 | Oda et al. |
| 2009/0019698 A1 | 1/2009 | Christoff |
| 2009/0042160 A1 | 2/2009 | Ofir |
| 2009/0088838 A1 | 4/2009 | Shaolian et al. |
| 2009/0191502 A1 | 7/2009 | Cao et al. |
| 2009/0197217 A1 | 8/2009 | Butscher et al. |
| 2009/0216322 A1 | 8/2009 | Le et al. |
| 2009/0220907 A1 | 9/2009 | Suyama |
| 2009/0220920 A1 | 9/2009 | Primus et al. |
| 2009/0222075 A1 | 9/2009 | Gordon |
| 2010/0092903 A1 | 4/2010 | Sabilla |
| 2010/0092905 A1 | 4/2010 | Martin |
| 2010/0105000 A1 | 4/2010 | Scommegna et al. |
| 2010/0129765 A1 | 5/2010 | Mohr et al. |
| 2010/0129766 A1 | 5/2010 | Hilgers |
| 2010/0178628 A1 | 7/2010 | Kim |
| 2010/0179789 A1 | 7/2010 | Sachdeva et al. |
| 2010/0193979 A1 | 8/2010 | Goldberg et al. |

(56) References Cited

U.S. PATENT DOCUMENTS

| | | |
|---|---|---|
| 2010/0241120 A1 | 9/2010 | Bledsoe et al. |
| 2010/0279243 A1 | 11/2010 | Cinader, Jr. et al. |
| 2010/0304321 A1 | 12/2010 | Patel |
| 2011/0008745 A1 | 1/2011 | McQuillan et al. |
| 2011/0027743 A1 | 2/2011 | Cinader, Jr. et al. |
| 2011/0059414 A1 | 3/2011 | Hirsch |
| 2011/0091832 A1 | 4/2011 | Kim et al. |
| 2011/0220612 A1 | 9/2011 | Kim |
| 2011/0250556 A1 | 10/2011 | Heiser |
| 2011/0270583 A1 | 11/2011 | Getto et al. |
| 2011/0287376 A1 | 11/2011 | Walther |
| 2011/0314891 A1 | 12/2011 | Gilbert |
| 2012/0048432 A1 | 3/2012 | Johnson et al. |
| 2012/0129119 A1 | 5/2012 | Oda |
| 2012/0148972 A1 | 6/2012 | Lewis |
| 2012/0208144 A1 | 8/2012 | Chiaramonte |
| 2012/0266419 A1 | 10/2012 | Browne et al. |
| 2012/0315595 A1 | 12/2012 | Beaudoin |
| 2012/0322019 A1 | 12/2012 | Lewis |
| 2013/0065193 A1 | 3/2013 | Curiel et al. |
| 2013/0122443 A1 | 5/2013 | Huang et al. |
| 2013/0177862 A1 | 7/2013 | Johnson |
| 2013/0196281 A1 | 8/2013 | Thornton |
| 2013/0196282 A1 | 8/2013 | Eichelberger et al. |
| 2013/0260329 A1 | 10/2013 | Voudouris |
| 2013/0315595 A1 | 11/2013 | Barr |
| 2014/0154637 A1 | 6/2014 | Hansen et al. |
| 2014/0170586 A1 | 6/2014 | Cantarella |
| 2014/0234794 A1 | 8/2014 | Vu |
| 2014/0255864 A1 | 9/2014 | Machata et al. |
| 2014/0287376 A1 | 9/2014 | Hultgren et al. |
| 2014/0363782 A1 | 12/2014 | Wiechmann et al. |
| 2015/0010879 A1 | 1/2015 | Kurthy |
| 2015/0064641 A1 | 3/2015 | Gardner |
| 2015/0072299 A1 | 3/2015 | Alauddin et al. |
| 2015/0140501 A1 | 5/2015 | Kim |
| 2015/0201943 A1 | 7/2015 | Brooks et al. |
| 2015/0265376 A1 | 9/2015 | Kopelman |
| 2015/0305833 A1 | 10/2015 | Cosse |
| 2015/0313687 A1 | 11/2015 | Blees et al. |
| 2015/0351872 A1 | 12/2015 | Jo |
| 2015/0359610 A1 | 12/2015 | Gonzalez et al. |
| 2015/0366638 A1 | 12/2015 | Kopelman et al. |
| 2016/0074139 A1 | 3/2016 | Machata et al. |
| 2016/0095670 A1 | 4/2016 | Witte et al. |
| 2016/0106522 A1 | 4/2016 | Kim |
| 2016/0135926 A1* | 5/2016 | Djamchidi .............. A61C 7/20 425/166 |
| 2016/0166357 A1 | 6/2016 | Portalupi |
| 2016/0175073 A1 | 6/2016 | Huang |
| 2016/0206403 A1 | 7/2016 | Ouellette et al. |
| 2016/0228214 A1 | 8/2016 | Sachdeva et al. |
| 2016/0242871 A1 | 8/2016 | Morton et al. |
| 2016/0270885 A1 | 9/2016 | Kwon et al. |
| 2016/0278883 A1 | 9/2016 | Fasci et al. |
| 2016/0287354 A1 | 10/2016 | Viecilli et al. |
| 2016/0310239 A1 | 10/2016 | Paehl et al. |
| 2016/0374780 A1 | 12/2016 | Carrillo Gonzalez et al. |
| 2017/0086948 A1 | 3/2017 | Von Mandach |
| 2017/0105816 A1 | 4/2017 | Ward |
| 2017/0105817 A1 | 4/2017 | Chun et al. |
| 2017/0128169 A1 | 5/2017 | Lai et al. |
| 2017/0135793 A1 | 5/2017 | Webber et al. |
| 2017/0140381 A1 | 5/2017 | Ducrohet et al. |
| 2017/0151037 A1 | 6/2017 | Lee |
| 2017/0156823 A1 | 6/2017 | Roein Peikar et al. |
| 2017/0165032 A1* | 6/2017 | Webber ................. B33Y 80/00 |
| 2017/0165532 A1 | 6/2017 | Khan et al. |
| 2017/0181813 A1 | 6/2017 | Kalkhoran |
| 2017/0196660 A1 | 7/2017 | Lee |
| 2017/0224444 A1 | 8/2017 | Viecilli et al. |
| 2017/0231721 A1 | 8/2017 | Akeel et al. |
| 2017/0246682 A1 | 8/2017 | Duerig |
| 2017/0252140 A1 | 9/2017 | Murphy et al. |
| 2017/0281313 A1 | 10/2017 | Kim |
| 2017/0281314 A1 | 10/2017 | Freimuller |
| 2017/0296253 A1 | 10/2017 | Brandner et al. |
| 2017/0296304 A1* | 10/2017 | Tong ..................... A61C 7/28 |
| 2017/0312052 A1 | 11/2017 | Moss et al. |
| 2017/0318881 A1 | 11/2017 | Fonte et al. |
| 2017/0325911 A1 | 11/2017 | Marshall |
| 2017/0340777 A1 | 11/2017 | Ma et al. |
| 2018/0014915 A1* | 1/2018 | Voudouris ............... A61C 7/28 |
| 2018/0014916 A1 | 1/2018 | Cinader, Jr. et al. |
| 2018/0021108 A1 | 1/2018 | Cinader, Jr. et al. |
| 2018/0049847 A1 | 2/2018 | Oda et al. |
| 2018/0055605 A1 | 3/2018 | Witte et al. |
| 2018/0071057 A1 | 3/2018 | Rudman |
| 2018/0110589 A1 | 4/2018 | Gao |
| 2018/0132974 A1 | 5/2018 | Rudman |
| 2018/0161121 A1 | 6/2018 | Butler et al. |
| 2018/0161126 A1 | 6/2018 | Marshall et al. |
| 2018/0168788 A1 | 6/2018 | Fernie |
| 2018/0185120 A1 | 7/2018 | Wool |
| 2018/0185121 A1 | 7/2018 | Pitts et al. |
| 2018/0206941 A1 | 7/2018 | Lee |
| 2018/0214250 A1 | 8/2018 | Martz |
| 2018/0235437 A1 | 8/2018 | Ozerov et al. |
| 2018/0243052 A1 | 8/2018 | Lee |
| 2018/0338564 A1 | 11/2018 | Oda et al. |
| 2019/0001396 A1 | 1/2019 | Riemeier et al. |
| 2019/0019187 A1 | 1/2019 | Miller et al. |
| 2019/0053876 A1 | 2/2019 | Sterental et al. |
| 2019/0090988 A1 | 3/2019 | Schumacher et al. |
| 2019/0090989 A1 | 3/2019 | Jo |
| 2019/0125494 A1 | 5/2019 | Li et al. |
| 2019/0142551 A1 | 5/2019 | Dickenson et al. |
| 2019/0159871 A1 | 5/2019 | Chan et al. |
| 2019/0163060 A1 | 5/2019 | Skamser et al. |
| 2019/0175304 A1 | 6/2019 | Morton et al. |
| 2019/0231488 A1 | 8/2019 | Dickerson |
| 2019/0247147 A1 | 8/2019 | Grande et al. |
| 2019/0252065 A1 | 8/2019 | Katzman et al. |
| 2019/0262103 A1* | 8/2019 | Cassalia ................ A61C 7/20 |
| 2019/0276921 A1 | 9/2019 | Duerig et al. |
| 2019/0321136 A1 | 10/2019 | Martz et al. |
| 2019/0321138 A1 | 10/2019 | Roein Peikar et al. |
| 2019/0328487 A1 | 10/2019 | Levin et al. |
| 2019/0328491 A1 | 10/2019 | Hostettler et al. |
| 2019/0343606 A1 | 11/2019 | Wu et al. |
| 2019/0350682 A1 | 11/2019 | Cinader, Jr. et al. |
| 2019/0388189 A1 | 12/2019 | Shivapuja et al. |
| 2020/0000551 A1 | 1/2020 | Li et al. |
| 2020/0066391 A1 | 2/2020 | Sachdeva et al. |
| 2020/0078137 A1 | 3/2020 | Chen et al. |
| 2020/0107911 A1 | 4/2020 | Roein Peikar et al. |
| 2020/0129272 A1 | 4/2020 | Roein Peikar et al. |
| 2020/0138549 A1 | 5/2020 | Chun et al. |
| 2020/0146779 A1 | 5/2020 | Zhang |
| 2020/0146791 A1 | 5/2020 | Schülke et al. |
| 2020/0170757 A1 | 6/2020 | Kopelman et al. |
| 2020/0188063 A1 | 6/2020 | Cinader, Jr. et al. |
| 2020/0197131 A1 | 6/2020 | Matov et al. |
| 2020/0214806 A1 | 7/2020 | Hung |
| 2020/0229903 A1 | 7/2020 | Sandwick |
| 2020/0275996 A1 | 9/2020 | Tong et al. |
| 2020/0281611 A1 | 9/2020 | Kelly et al. |
| 2020/0338706 A1 | 10/2020 | Cunningham et al. |
| 2020/0345455 A1 | 11/2020 | Roein Peikar et al. |
| 2020/0345459 A1 | 11/2020 | Schueller et al. |
| 2020/0345460 A1 | 11/2020 | Roein Peikar et al. |
| 2020/0352765 A1 | 11/2020 | Lin |
| 2020/0360109 A1 | 11/2020 | Gao et al. |
| 2020/0375270 A1 | 12/2020 | Holschuh et al. |
| 2020/0375699 A1 | 12/2020 | Roein Peikar et al. |
| 2020/0390524 A1 | 12/2020 | Roein Peikar et al. |
| 2020/0390535 A1 | 12/2020 | Curtis et al. |
| 2020/0405191 A1 | 12/2020 | Lotan et al. |
| 2020/0405452 A1 | 12/2020 | Song et al. |
| 2021/0007830 A1 | 1/2021 | Roein Peikar et al. |
| 2021/0007832 A1 | 1/2021 | Roein Peikar et al. |
| 2021/0045701 A1 | 2/2021 | Unklesbay et al. |
| 2021/0068928 A1 | 3/2021 | Witte et al. |
| 2021/0077227 A1 | 3/2021 | Griffin, III et al. |

(56) References Cited

U.S. PATENT DOCUMENTS

| | | |
|---|---|---|
| 2021/0093422 A1 | 4/2021 | Tong et al. |
| 2021/0128275 A1 | 5/2021 | Suh et al. |
| 2021/0134450 A1 | 5/2021 | Katzman et al. |
| 2021/0137644 A1 | 5/2021 | Benarouch et al. |
| 2021/0145547 A1 | 5/2021 | Roein Peikar et al. |
| 2021/0177551 A1 | 6/2021 | Roein Peikar et al. |
| 2021/0186662 A1 | 6/2021 | Roein Peikar et al. |
| 2021/0205049 A1 | 7/2021 | Cinader, Jr. |
| 2021/0212803 A1 | 7/2021 | Tong et al. |
| 2021/0244502 A1 | 8/2021 | Farkash et al. |
| 2021/0244505 A1 | 8/2021 | Tong et al. |
| 2021/0244507 A1 | 8/2021 | Curiel et al. |
| 2021/0251730 A1 | 8/2021 | Curiel et al. |
| 2021/0259808 A1 | 8/2021 | Ben-gal Nguyen et al. |
| 2021/0275286 A1 | 9/2021 | Karazivan et al. |
| 2021/0330430 A1 | 10/2021 | Khoshnevis et al. |
| 2021/0338380 A1 | 11/2021 | Park et al. |
| 2021/0346127 A1 | 11/2021 | Cassalia |
| 2021/0353389 A1 | 11/2021 | Peikar et al. |
| 2021/0369413 A1 | 12/2021 | Li et al. |
| 2021/0378792 A1 | 12/2021 | Akopov et al. |
| 2021/0386523 A1 | 12/2021 | Raby, II et al. |
| 2021/0393375 A1 | 12/2021 | Chekh et al. |
| 2021/0401546 A1 | 12/2021 | Gardner |
| 2021/0401548 A1 | 12/2021 | Oda et al. |
| 2022/0008169 A1 | 1/2022 | Reisman |
| 2022/0023009 A1 | 1/2022 | Tong et al. |
| 2022/0031428 A1 | 2/2022 | Khoshnevis et al. |
| 2022/0039921 A1 | 2/2022 | Kopelman et al. |
| 2022/0039922 A1 | 2/2022 | Yamaguchi |
| 2022/0061964 A1 | 3/2022 | Khoshnevis et al. |
| 2022/0087783 A1 | 3/2022 | Khoshnevis et al. |
| 2022/0133438 A1 | 5/2022 | Wratten, Jr. et al. |
| 2022/0137592 A1 | 5/2022 | Cramer et al. |
| 2022/0168072 A1 | 6/2022 | Tong et al. |
| 2022/0183797 A1 | 6/2022 | Khoshnevis et al. |
| 2022/0226076 A1 | 7/2022 | Roein Peikar et al. |
| 2022/0226077 A1 | 7/2022 | Roein Peikar et al. |
| 2022/0249201 A1 | 8/2022 | Shuman et al. |
| 2022/0257341 A1 | 8/2022 | Somasundaram et al. |
| 2022/0257344 A1 | 8/2022 | Tsai et al. |
| 2022/0304773 A1 | 9/2022 | Wratten, Jr. et al. |
| 2022/0304774 A1 | 9/2022 | Wratten, Jr. et al. |
| 2022/0314508 A1 | 10/2022 | Subramaniam et al. |
| 2022/0323183 A1 | 10/2022 | Dufour et al. |
| 2022/0338960 A1 | 10/2022 | Reising |
| 2022/0346912 A1 | 11/2022 | Li et al. |
| 2022/0361996 A1 | 11/2022 | Raby et al. |
| 2023/0012364 A1 | 1/2023 | Melka et al. |
| 2023/0070165 A1 | 3/2023 | Tong et al. |
| 2023/0070837 A1 | 3/2023 | Oda |
| 2023/0072074 A1 | 3/2023 | Oda |
| 2023/0100466 A1 | 3/2023 | Huynh et al. |
| 2023/0157790 A1 | 5/2023 | Medvinskaya et al. |
| 2023/0404715 A1 | 12/2023 | Peikar et al. |
| 2023/0414327 A1 | 12/2023 | Peikar et al. |
| 2024/0058101 A1 | 2/2024 | Tong et al. |
| 2024/0061966 A1 | 2/2024 | Oda et al. |
| 2024/0090980 A1 | 3/2024 | Tong et al. |
| 2024/0138958 A1 | 5/2024 | Oda et al. |
| 2024/0173105 A1 | 5/2024 | Tong et al. |

FOREIGN PATENT DOCUMENTS

| | | |
|---|---|---|
| CN | 201320224 Y | 10/2009 |
| CN | 102215773 | 10/2011 |
| CN | 202365955 | 8/2012 |
| CN | 202892116 | 4/2013 |
| CN | 203074896 | 7/2013 |
| CN | 103505293 | 1/2014 |
| CN | 203506900 | 4/2014 |
| CN | 104188728 | 12/2014 |
| CN | 204049881 | 12/2014 |
| CN | 205126459 | 4/2016 |
| CN | 105596098 | 5/2016 |
| CN | 105662615 | 6/2016 |
| CN | 205416056 | 8/2016 |
| CN | 205569100 | 9/2016 |
| CN | 106029002 | 10/2016 |
| CN | 106137419 | 11/2016 |
| CN | 105520787 | 12/2017 |
| CN | 108690967 | 10/2018 |
| CN | 109009504 | 12/2018 |
| CN | 110916820 | 2/2020 |
| CN | 110840586 | 2/2022 |
| CN | 114167807 | 3/2022 |
| CN | 117695035 | 3/2024 |
| DE | 3915807 | 11/1990 |
| DE | 20 2018 003 574 U1 | 8/2018 |
| DE | 10 2018 005 769 A1 | 1/2020 |
| DE | 10 2018 133 705 A1 | 7/2020 |
| DE | 10 2015 017 301 B3 | 3/2022 |
| EP | 0 778 008 | 6/1997 |
| EP | 1 139 902 | 10/2001 |
| EP | 1 276 433 | 1/2003 |
| EP | 1 379 193 B1 | 2/2007 |
| EP | 2 076 207 | 7/2009 |
| EP | 1 073 378 B1 | 1/2012 |
| EP | 2 522 298 | 11/2012 |
| EP | 2 617 383 | 7/2013 |
| EP | 3 285 678 | 5/2021 |
| EP | 3 954 320 | 2/2022 |
| EP | 2 726 049 | 8/2022 |
| EP | 3 019 141 | 8/2022 |
| EP | 4 034 077 | 8/2022 |
| EP | 4 035 649 | 8/2022 |
| EP | 4 044 959 | 8/2022 |
| EP | 4 048 196 | 8/2022 |
| EP | 4065647 A1 | 8/2022 |
| EP | 3 691 559 | 9/2022 |
| EP | 3 823 813 | 9/2022 |
| EP | 3 905 986 | 9/2022 |
| EP | 4 056 144 | 9/2022 |
| ES | 2315046 | 4/2010 |
| FR | 2 525 469 | 10/1983 |
| FR | 3 056 393 B1 | 10/2018 |
| JP | 11221235 A | 8/1999 |
| JP | 2001198143 A | 7/2001 |
| JP | 2009205330 A | 9/2009 |
| KR | 100549294 | 2/2006 |
| KR | 100737442 | 7/2007 |
| KR | 100925286 | 11/2009 |
| KR | 101301886 | 8/2013 |
| KR | 101583547 | 1/2016 |
| KR | 101584737 | 1/2016 |
| KR | 101723674 | 4/2017 |
| RU | 133408 U1 | 10/2013 |
| WO | WO 01/80761 | 11/2001 |
| WO | WO 01/85047 | 11/2001 |
| WO | WO 2003/045266 | 6/2003 |
| WO | WO 2005/008441 | 1/2005 |
| WO | WO 2005/094716 | 10/2005 |
| WO | WO 2007/069286 | 6/2007 |
| WO | WO 2008/051774 | 5/2008 |
| WO | WO 2011/034522 | 3/2011 |
| WO | WO 2011/090502 | 7/2011 |
| WO | WO 2011/103669 | 9/2011 |
| WO | WO 2012/089735 | 7/2012 |
| WO | WO 2012/140021 | 10/2012 |
| WO | WO 2013/019398 | 2/2013 |
| WO | WO 2014/070920 | 5/2014 |
| WO | WO 2016/148961 | 9/2016 |
| WO | WO 2016/149008 | 9/2016 |
| WO | WO 2016/199972 | 12/2016 |
| WO | WO 2016/210402 | 12/2016 |
| WO | WO 2017/007079 | 1/2017 |
| WO | WO 2017/112004 | 6/2017 |
| WO | WO 2017/172537 | 10/2017 |
| WO | WO 2017/184632 | 10/2017 |
| WO | WO 2017/194478 | 11/2017 |
| WO | WO 2017/198640 | 11/2017 |
| WO | WO 2018/102588 | 6/2018 |
| WO | WO 2018/122862 | 7/2018 |
| WO | WO 2018/144634 | 8/2018 |

(56) References Cited

FOREIGN PATENT DOCUMENTS

| | | |
|---|---|---|
| WO | WO 2018/195356 | 10/2018 |
| WO | WO 2019/135504 | 7/2019 |
| WO | WO 2020/095182 | 5/2020 |
| WO | WO 2020/178353 | 9/2020 |
| WO | WO 2020/180740 | 9/2020 |
| WO | WO 2020/223744 | 11/2020 |
| WO | WO 2020/223745 | 11/2020 |
| WO | WO 2021/087158 | 5/2021 |
| WO | WO 2021/105878 | 6/2021 |
| WO | WO 2021/214613 | 10/2021 |
| WO | WO 2021/225916 A2 | 11/2021 |
| WO | WO 2021/226618 | 11/2021 |
| WO | WO 2021/225916 A3 | 12/2021 |
| WO | WO 2021/245484 | 12/2021 |
| WO | WO 2021/252675 | 12/2021 |
| WO | WO 2022/099263 | 5/2022 |
| WO | WO 2022/099267 | 5/2022 |
| WO | WO 2022/123402 | 6/2022 |
| WO | WO 2022/137109 | 6/2022 |
| WO | WO 2022/145602 | 7/2022 |
| WO | WO 2022/159738 | 7/2022 |
| WO | WO 2022/162488 | 8/2022 |
| WO | WO 2022/162528 | 8/2022 |
| WO | WO 2022/162614 | 8/2022 |
| WO | WO 2022/167899 | 8/2022 |
| WO | WO 2022/167995 | 8/2022 |
| WO | WO 2022/180466 | 9/2022 |
| WO | WO 2022/189906 | 9/2022 |
| WO | WO 2022/192409 | 9/2022 |
| WO | WO 2022/195391 | 9/2022 |
| WO | WO 2022/204711 | 9/2022 |
| WO | WO 2022/214895 | 10/2022 |
| WO | WO 2022/217269 | 10/2022 |
| WO | WO 2022/219459 | 10/2022 |
| WO | WO 2022/229734 | 11/2022 |
| WO | WO 2022/229739 | 11/2022 |
| WO | WO 2022/236027 | 11/2022 |
| WO | WO 2022/236287 | 11/2022 |
| WO | WO 2023/033869 | 3/2023 |
| WO | WO 2023/033870 | 3/2023 |
| WO | WO 2023/034876 | 3/2023 |
| WO | WO 2024/040008 | 2/2024 |
| WO | WO 2024/059653 | 3/2024 |

OTHER PUBLICATIONS

Invisalign® SmileView™, How Would You Look with Straight Teeth?, https://www.invisalign.com/get-started/invisalign-smileview?v=0#start, printed Jun. 7, 2022 in 2 pages.
A ScanBox demo, https://www.youtube.com/watch?v=MsCfv2PDQ0o, screen shots at 0:08 and 0:19 of YouTube video, uploaded May 5, 2019 in 2 pages.
Southern Maine Orthodontics, Virtual Orthodontic Treatment, https://southernmainebraces.com/virtual-orthodontic-treatment/, printed Jun. 7, 2022 in 3 pages.
International Search Report and Written Opinion in Application No. PCT/US2022/19565, mailed Jul. 6, 2022, in 17 pages.
Coro, Jorge C. et al., "MEAW Therapy" MEAW Therapy—Orthodontic Products, accessed via http://www.orthodonticproductsonline.com/2012/11/meaw-therapy/ on Mar. 14, 2016, published Nov. 12, 2012 in 6 pages.
ElSheikh, Moaaz Mohamed, et al. "A Forsus Distalizer: A Pilot Typodont Study". Jul.-Dec. 2004, KDJ, vol. 7, No. 2, pp. 107-115.
Gilbert, Alfredo. An in-office wire-bending robot for lingual orthodontics. ResearchGate. Article in Journal of clinical orthodontics: JCO, Apr. 2011.
Glauser-Williams Orthodontics: Appliances, http://www.glauserwilliamsorthodontics.com/treatments/orthodontic-appliances.php, accessed Nov. 30, 2015 in 4 pages.
Jiang et al. Bending Process Analysis and Structure Design of Orthodontic Archwire Bending Robot. International Journal of Smart Home. vol. 7, No. 5 (2013), pp. 345-352. http://dx.doi.org/10.14257/ijsh.2013.7.5.33.
Jiang et al. A Review on Robot in Prosthodontics and Orthodontics. Hindawi Publishing Corporation. Advances in Mechanical Engineering. Article ID 198748. 2014. 11 pages.
Mahony, Derek, "How We Got From There to Here and Back". Dental Learning Hub (Capture of web page dated Jun. 24, 2013 downloaded from http://web.archive.org/web/20130624145806/http://www.dental-learninghub.com/Clinical/Orthodontics.aspx, downloaded Feb. 7, 2014).
Miller, R.J. et al. "Validation of Align Technology's Treat III™ Digital Model Superimposition Tool and Its Case Application". Orthodontic Craniofacial Res.,2003, vol. 6 (Suppl 1): pp. 143-149.
SureSmile. 2013. About SureSmile. (Capture of web page dated Jun. 21, 2013 downloaded from http://web.archive.org/web/20130621031404/http://suresmile.com/About-SureSmile, downloaded Feb. 7, 2014).
Xia, et al. Development of a Robotic System for Orthodontic Archwire Bending. 2016 IEEE International Conference on Robotics and Automation (ICRA). Stockholm, Sweden, May 16-21, 2016. pp. 730-735.
Yang, Won-Sik, et al. "A Study of the Regional Load Deflection Rate of Multiloop Edgewise Arch Wire." Angle Orthodontist, 2001, vol. 7, No. 2, pp. 103-109.
Spini et al., "Transition temperature range of thermally activated nickel-titanium archwires", J Appl Oral Sci., Apr. 2014, vol. 22, No. 2, pp. 109-117.
Sinodentalgroup, "Braces Bonding Teeth Gems Glue Light Cure Adhesive", https://sinodentalgroup.myshopify.com/products/sino-dental-group-orthodontic-brackets-glue-braces-bonding-light-cure-adhesive-kit?pr_prod_strat=use_description&pr_rec_id=0d0a6cdc9&pr_rec_pid=6687895355572&pr_ref_pid=6705886363828&pr_seq=uniform, dated as downloaded Jun. 7, 2023 in 12 pages.
In Brace, Brush & Floss Easily with In Brace, dated as uploaded on: May 26, 2022, YouTube, Retrieved from Internet: https://www.youtube.com/watch?v=uAsxiBlbY4Y (Dated Year: 2022).
MEAW School, Introduction to MEAW (Multi-loop Edgewise Arch Wire), dated as uploaded on: Mar. 24, 2021, YouTube, Retrieved from Internet: https://www.youtube.com/watch?v=ne785jIzN Pg (Year: 2021).
Richard Gawel, Swift Health Systems Raises $45 Million to Finance Invisible Orthodontics, dated as published on: Dec. 4, 2019, dentistrytoday.com, Retrieved from Internet: https://www.dentistrytoday.com/products/swift-health-systems-raises-45-million-to-finance-invisible-orthodontics/ (Dated Year: 2019).
In Brace, What Is In Brace?—Integration Booster, dated as uploaded on: May 22, 2023, YouTube, Retrieved from Internet: https://www.youtube.com/watch?v=ANUPkCSfQo4 (Dated Year: 2023).

\* cited by examiner

INDIRECT ORTHODONTIC BONDING SYSTEMS AND METHODS

CROSS REFERENCE TO RELATED APPLICATIONS

This application claims priority to U.S. Provisional Patent Application No. 63/160,166, filed Mar. 12, 2021, which is incorporated herein by reference in its entirety. Any and all applications, if any, for which a foreign or domestic priority claim is identified in the Application Data Sheet of the present application is hereby incorporated by reference under 37 CFR 1.57.

BACKGROUND

Field of the Invention

This invention relates in some aspects to indirect orthodontic bonding systems and methods, including indirect orthodontic bonding trays.

SUMMARY

Indirect orthodontic bonding (IDB) trays can be used by orthodontists to place one or more brackets on a patient's teeth in predetermined locations. The IDB tray can be custom made for a patient's dental arch. The IDB tray can include one or more wells to receive an orthodontic bracket therein. The orthodontist can place an orthodontic bracket in a well with a bonding surface facing outward. An adhesive can be applied to a bonding surface of the orthodontic bracket. The IDB tray can be placed over a dental arch of the patient to apply the bonding surface of the orthodontic brackets to the patient's teeth. The adhesive can bond the bonding surfaces of the orthodontic brackets to the surfaces of the patient's teeth, securing the orthodontic brackets in predetermined locations on the patient's teeth. Loading one or more orthodontic brackets into the one or more wells of the IDB tray can be a time intensive process. Additionally, orthodontic brackets may be dropped on a contaminated surface during the loading process, requiring the orthodontic brackets to be cleaned—prolonging the administration of orthodontic care. Inadequate or excessive adhesive may be applied to the bonding surfaces, decreasing bonding reliability.

The IDB systems (e.g., kits) and methods described herein solve at least the foregoing problems. The IDB systems and methods described herein can advance the ease of use of IDB trays and minimize errors during bracket bonding. The IDB trays can be custom designed and formed for a particular patient's dental arch or segment of a dental arch segment based on images (e.g., scans) of a patient's mouth. The IDB tray can be formed by an IDB tray manufacturer. The IDB tray can include one or more wells shaped to receive an orthodontic bracket. The IDB tray manufacturer can load an orthodontic bracket into each of the one or more wells of the IDB tray with a bonding surface of the orthodontic bracket facing out of the well. The IDB tray manufacturer can apply an adhesive to the bonding surface of the orthodontic brackets in the one or more wells. The IDB tray manufacturer can select the quantity and type of adhesive used, which can improve bonding reliability. The loaded IDB tray (e.g., the IDB tray with the preloaded brackets and bonding surfaces with uncured pre-pasted adhesive) can be placed in a container to prevent curing of the adhesive. The loaded IDB tray, also referred to as an preloaded or preassembled IDB system or preloaded IDB tray, within the container can be shipped to an orthodontist's office for use. When ready for use, the orthodontist can remove the loaded IDB tray from the container and/or another controlled environment and place the loaded IDB tray over the dental arch of the patient to bond the one or more orthodontic brackets to the patient's teeth.

In some variants, a kit for bonding one or more orthodontic brackets to a dental arch of a patient is disclosed. The kit can include a preloaded indirect orthodontic bonding (IDB) tray. The preloaded IDB tray can include an IDB tray with one or more wells. The preloaded IDB tray can include one or more orthodontic brackets placed within the one or more wells. A bonding surface of the one or more orthodontic brackets can face out of the one or more wells. The preloaded IDB tray can include an adhesive applied onto the bonding surface of the one or more orthodontic brackets. The kit can include a container for housing the preloaded IDB tray during shipment. The container can prevent the adhesive from curing.

In some variants, the preloaded IDB tray can include a primer applied to the bonding surface of the one or more orthodontic brackets.

In some variants, the kit can include one or more archforms that can couple to the one or more orthodontic brackets when bonded to a patient's teeth. The one or more archforms can move the patient's teeth.

In some variants, the kit can include a tool that can facilitate coupling an archform of the one or more archforms to the one or more orthodontic brackets when bonded to a patient's teeth.

In some variants, the IBD tray can be in separate segments corresponding to portions of a patient's dental arch.

In some variants, a method of producing a loaded indirect orthodontic bonding (IDB) tray for distribution is disclosed herein. The method can include forming the IDB tray with one or more wells. The method can include placing an orthodontic bracket into the one or more wells such that a bonding surface of the orthodontic bracket can face out of the one or more wells. The method can include applying an adhesive to the bonding surface of the orthodontic bracket. The method can include placing the IDB tray preloaded with the orthodontic bracket and pre-pasted adhesive into a container for distribution. The container can prevent the adhesive from curing.

In some variants, the method can include applying a primer to the bonding surface of the orthodontic bracket.

In some variants, forming the IDB tray with the one or more wells can include 3D printing the IDB tray based on a digital model of at least a portion of a patient's dental arch.

In some variants, forming the IDB tray with the one or more wells can include molding over a 3D model of a patient's dental arch or portion thereof with one or more features positioned to form the one or more wells.

In some variants, a preloaded indirect orthodontic bonding (IDB) tray for distribution is disclosed herein. The preloaded IDB tray can include an IDB tray with one or more wells. The preloaded IDB tray can include one or more orthodontic brackets placed within the one or more wells. A bonding surface of the one or more orthodontic brackets can face out of the one or more wells. The preloaded IDB tray can include a primer applied to the bonding surface of the one or more orthodontic brackets. The preloaded IDB tray can include an adhesive pasted onto the bonding surface of the one or more orthodontic brackets.

In some variants, the preloaded IDB tray can be distributed to an orthodontist in a container that can prevent the adhesive from curing such that the preloaded IDB tray is ready for placement on a dental arch of a patient upon receipt by the orthodontist.

In some variants, the IDB tray can include a channel and the archform can be disposed in the channel.

In some variants, the preloaded IDB tray can include an archform disposed in the IDB tray.

In some variants, the archform can be coupled to the one or more orthodontic brackets.

In some variants, a preloaded indirect bonding (IDB) tray for distribution is disclosed herein. The preloaded IDB tray can include an indirect bonding (IDB) tray with a plurality of wells. Each of the plurality of wells can hold an adhesive therein. The preloaded IDB tray can include a retainer that can be adhered to the surfaces of a patient's teeth. The retainer can be disposed in the IDB tray and through the adhesive disposed in the plurality of wells.

In some variants, the retainer can be bonded to lingual surfaces of a patient's teeth.

In some variants, the retainer can be a braided stainless steel wire.

In some variants, the IDB tray can include a channel holding the retainer.

The channel can extend through the plurality of wells.

In some variants, the channel can span between adjacent wells of the plurality of wells.

In some variants, a kit for bonding a retainer to surfaces of a patient's teeth is disclosed herein. The kit can include a preloaded IDB tray, such as any disclosed herein. The kit can include a container for housing the preloaded IDB tray. The container can prevent the adhesive from curing.

In some variants, a method of bonding a retainer to surfaces of a patient's teeth is disclosed herein. The method can include placing a retainer into an indirect bonding (IDB) tray. The retainer can be flexible. The retainer can conform to contours of the IDB tray. The method can include flowing adhesive into wells of the IDB tray. The method can include positioning the IDB tray over the patient's teeth. The method can include curing the adhesive to bond the retainer to the surfaces of the patient's teeth and to form rounded mounds of cured adhesive on the surfaces of the patient's teeth. Portions of the retainer extending between rounded mounds of cured adhesive can be rigid. The method can include removing the IDB tray.

In some variants, curing the adhesive can include exposing the adhesive to UV light.

In some variants, the method can include forming the IDB tray.

In some variants, the forming the IDB tray can include 3D printing the IDB tray.

In some variants, the retainer can be a braided stainless steel wire.

In some variants, the placing the retainer into the IDB tray can include placing the retainer into a channel of the IDB tray. The channel can be disposed in a surface of the IDB tray that can face lingual surfaces of the patient's teeth when the IDB tray is positioned over the patient's teeth.

BRIEF DESCRIPTION OF THE DRAWINGS

These drawings are illustrative embodiments and do not present all possible embodiments of this invention. The illustrated embodiments are intended to illustrate, but not to limit, the scope of protection. Various features of the different disclosed embodiments can be combined to form further embodiments, which are part of this disclosure.

DETAILED DESCRIPTION

It can be difficult and/or time consuming to properly position one or more orthodontic brackets on a patient's teeth for bonding when administering a treatment plan to move the patient's teeth from maloccluded positions to predetermined positions. An indirect orthodontic bonding (IDB) tray can be used to assist an orthodontist or other individual attending to a patient to properly position the one or more orthodontic brackets on a patient's teeth in predetermined locations for bonding. The IDB tray can be used, in some variants, to position a plurality of orthodontic brackets simultaneously on a patient's teeth for bonding. Once the one or more orthodontic brackets are bonded to the patient's teeth, an archform can be coupled to the one or more orthodontic brackets to move the patient's teeth using sliding or non-sliding mechanics.

Disclosed herein are IDB systems (e.g., kits) and methods to advance the ease of use of IDB trays and minimize errors during bracket bonding. Preloaded IDB trays can include custom formed IDB trays with preloaded brackets with uncured pre-pasted adhesive applied thereto. The preloaded IDB trays can be produced by an IDB tray manufacturer and distributed to orthodontists in a container that prevents curing of the adhesive. In some variants, the container can be air tight, temperature controlled, and/or light blocking. The preloaded IDB trays can remain in the container or be removed from the container and placed in a controlled environment until the orthodontist or other individual is ready to bond the orthodontic brackets to the teeth of the patient.

Figure 1:
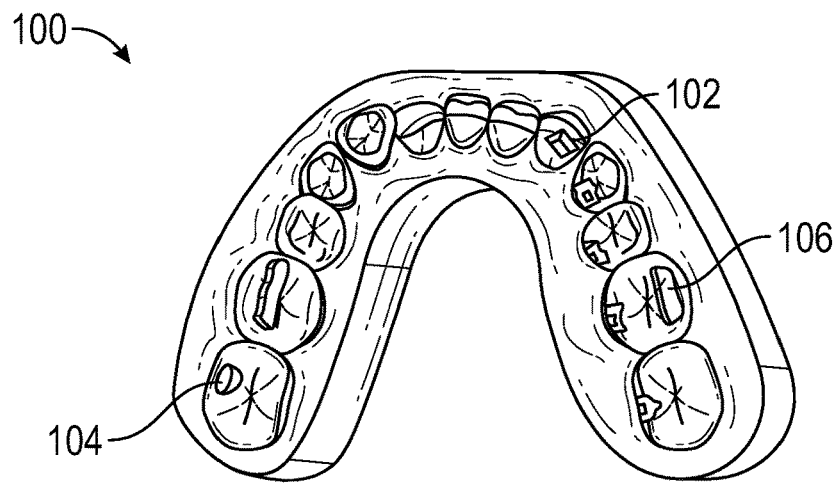
FIG. 1 illustrates an indirect orthodontic bonding (IDB) tray.

FIG. 1 illustrates a gingival auxiliary view of an indirect orthodontic bonding (IDB) tray 100. The IDB tray 100 can be custom formed for a patient's dental arch. The IDB tray 100 can be custom formed based on digital data from images (e.g., scans) of a patient's teeth which can be captured using a variety of techniques, which can include a digital intra-oral scanner, a cone-beam computed tomography (CBCT) X-ray scanner, and/or others. The IDB tray 100 can be formed via a variety of techniques. In some variants, the IDB tray 100 can be 3-D printed—also known as additive manufacturing. The IDB tray 100 can be 3-D printed based on a digital model of at least a portion of the patient's dental arch. The IDB tray 100 can be 3-D printed with a variety of materials, which can include one or more resins. In some variants, the IDB tray 100 can be formed via molding over a 3D model of a patient's dental arch with features (e.g., functional or non-functional brackets, bite turbos, auxiliaries, temporary anchoring devices, archform, buttons, etc.) positioned to create wells to receive the brackets, bite turbos, auxiliaries, temporary anchoring devices, archform, buttons, etc. that will be transferred to the patient's teeth. The moldable material can be a polyvinyl siloxane (PVS) material. The indirect bonding tray 100 can be formed of a single piece. The IDB tray 100 can be formed of multiple pieces.

In some variants, the IDB tray 100 can be formed of a soluble material, such as melted/dried (caramelized) sugar and/or cellulose. The soluble material can be structurally stiff when dry but dissolve when wet. Accordingly, the IDB tray 100, when formed of soluble material, can be used to place one or more orthodontic brackets on a patient's teeth and, after placement (e.g., bonding), the patient's mouth can be rinsed with water or another liquid—dissolving the IDB tray 100 made of soluble material.

The indirect bonding tray 100 can correspond to a patient's upper or lower dental arch. The IDB tray 100 can correspond to a section of a patient's upper or lower dental arch (e.g., 1, 2, 3, 4, or more teeth). The IDB tray 100 can include cavities to receive the patient's teeth. The indirect bonding tray 100 can include one or more wells for receiving orthodontic brackets, bite turbos, auxiliaries, temporary anchoring devices, archform, buttons, etc. to be transferred to the teeth of a patient. The one or more wells can be disposed in the portion (e.g., walls) of the IDB tray 100 defining a cavity to receive a tooth of the patient. The indirect bonding tray 100 can include one or more lingual orthodontic bracket wells 102. The indirect bonding tray 100 can include one or more buccal orthodontic button wells 104. The indirect bonding tray 100 can include one or more occlusal orthodontic bracket wells 106. The illustrated indirect bonding tray 100 includes lingual orthodontic bracket wells 102 for each tooth, occlusal bite turbo wells 106 on the first molars, and buccal orthodontic button wells 104 on the second molars. Other locations for the wells are contemplated. In some variants, a well is positioned to place an orthodontic bracket on one or more teeth of the patient's upper or lower dental arch. In some variants, a well is positioned to place an orthodontic bracket on each tooth of a patient's upper or lower dental arch. In some variants, the IDB tray 100 can include wells to receive orthodontic brackets and channel(s), slot(s), hook(s), and/or other feature(s) to receive an archform (e.g., archwire). The IDB tray 100 can receive the archform in the channel(s), slot(s), hook(s), and/or other feature(s). In some variants, the IDB tray 100 can include pins, rods, brackets, hooks, or the like that can be coupled with the IDB tray 100 to retain the archform within the channel or the like of the IDB tray 100. The orthodontic brackets can be loaded into the wells and couple with the archform. In some variants, the brackets can include a spring that facilitates the archform to be secured to the brackets. Adhesive can be applied to the bonding surfaces of the orthodontic brackets and the loaded IDB tray placed over the dental arch of the patient. The adhesive can be cured (e.g., exposure to UV light, air, and/or chemical(s)) to bond the orthodontic brackets to the patient's teeth (lingual, buccal, and/or occlusal surfaces). The IDB tray 100 can be removed, leaving the orthodontic brackets and archform installed in the patient's mouth to move the patient's teeth.

As described herein, the IDB tray 100 can be pre-loaded with one or more pre-pasted brackets before distribution to an orthodontist. Brackets can be loaded into wells of an IDB tray with a bonding surface facing out of the well, a primer can be applied to the bonding surface, and/or an adhesive can be applied to the primer before distribution to an orthodontist for use. In some variants, adhesive can be applied directly to the bonding surface without a primer.

The IDB trays and/or other components referenced herein may, in some variants, be made with and/or used with the methods and/or include features described in U.S. patent application Ser. No. 16/804,734, filed Feb. 28, 2020, entitled Indirect Bonding Trays With Bite Turbo and Orthodontic Auxiliary Integration, and published as U.S. Pub. No. 2020/0275996, which is incorporated by reference herein in its entirety. The IDB trays and/or other components referenced herein may, in some variants, be made with and/or used with the methods and/or include features described in U.S. patent application Ser. No. 17/084,383, filed Oct. 29, 2020, entitled Indirect Orthodontic Bonding Systems and Methods, and published as U.S. Pub. No. 2021/0128275, which is incorporated by reference herein in its entirety. The IDB trays and/or other components referenced herein may, in some variants, be made with and/or used with the methods and/or features (e.g., brackets, archforms, etc.) described in U.S. patent application Ser. No. 17/303,860, filed Jun. 9, 2021, entitled Orthodontic Appliance with Non-Sliding Archform, and published as U.S. Pub. No. 2021/0401548, which is incorporated by reference herein in its entirety. The IDB trays and/or other components referenced herein may, in some variants, be made with and/or used with the methods and/or features (e.g., brackets, archforms, etc.) described in U.S. patent application Ser. No. 14/067,690, filed Oct. 30, 2013, entitled Orthodontic Appliance with Snap Fitted, Non-Sliding Archwire, and published as U.S. Pub. No. 2014/0120491, which is incorporated by reference herein in its entirety.

Figure 2:
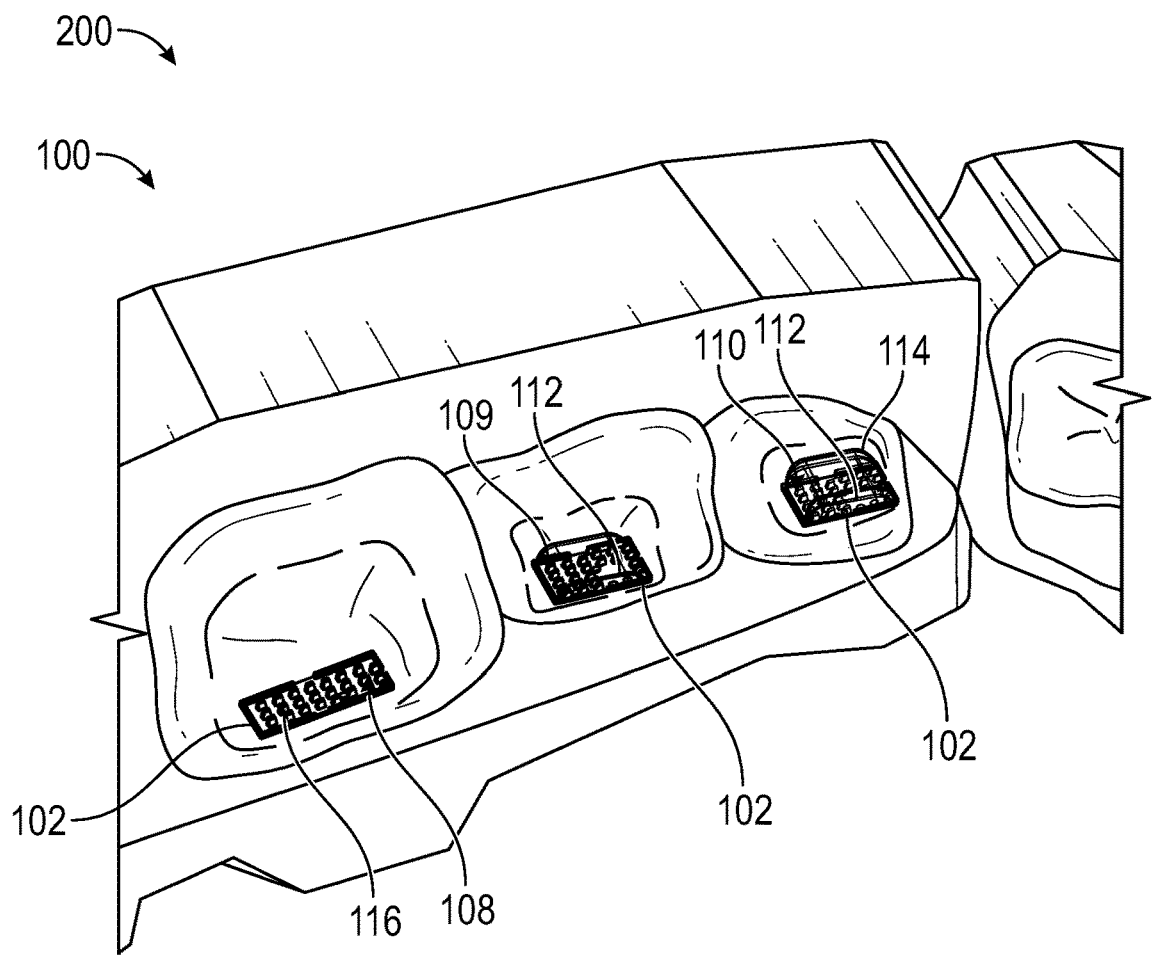
FIG. 2 illustrates an IDB tray with brackets positioned within wells of the IDB tray.

FIG. 2 illustrates an IDB tray 100 with an orthodontic bracket 108, orthodontic bracket 109, and orthodontic bracket 110 loaded, respectively, into wells of the IDB tray 100. In some variants, the brackets are the same. In some variants, the brackets are configured for the type of tooth upon which the bracket will be bonded (e.g., molar, lower anterior, etc.). The bracket 108 is positioned within a well with a bonding surface 116 facing out of the well. The bonding surface 116 can be bonded to a surface of a patient's tooth. The bonding surface 116 can include one or more features to improve bonding. For example, the bonding surface 116 can include features that increase the surface area of the bonding surface 116. In some variants, the bonding surface 116 can include grooves, slots, cuts, recesses, contours, and/or other features to improve bonding to the patient's tooth.

The bracket 109 is positioned within a well of the IDB tray 100. The bracket 109 is illustrated with a primer 112 disposed over the bonding surface 116. The primer 112 can be applied in preparation for the application of an adhesive. In some variants, no primer 112 is applied.

The bracket 110 is positioned within a well of the IDB tray 100. The bracket 110 is illustrated with an uncured adhesive 114 applied to the cured primer 112 disposed on the bonding surface 116 of bracket 110. In some variants, adhesive 114 is applied to the bonding surface 116 without primer 112. With an adhesive applied, the IDB tray 100 can be positioned over the patient's dental arch such that the bonding surface 116 is bonded to the surface of a patient's tooth via the adhesive 114. In some variants, the adhesive 114 cures from exposure to air, UV light, high temperatures, chemical(s), low temperatures, and/or other curing methods. As described herein, the pre-loaded IDB tray 200 (e.g., IDB tray with preloaded brackets that are pre-pasted with uncured adhesive), also referred to as the preassembled IDB system 200, can be placed within a container that prevents or delays curing of the adhesive 114 for distribution. The orthodontists can remove the pre-loaded IDB tray 200 from the container or another controlled environment for application of the preloaded IDB tray 200 on the dental arch of the patient. The adhesive 114 can cure, bonding the one or more orthodontic brackets to the patient's teeth. The IDB tray 200 can be removed from the patient's dental arch. An archform can be coupled to the one or more orthodontic brackets to move the patient's teeth according to a treatment plan. In some variants, the pre-loaded IDB tray 200 can hold an archform coupled to the one or more orthodontic brackets such that an orthodontist can omit the step of coupling an archform to the one or more brackets and install the one or more orthodontic brackets and archform in the same step.

Figure 3:
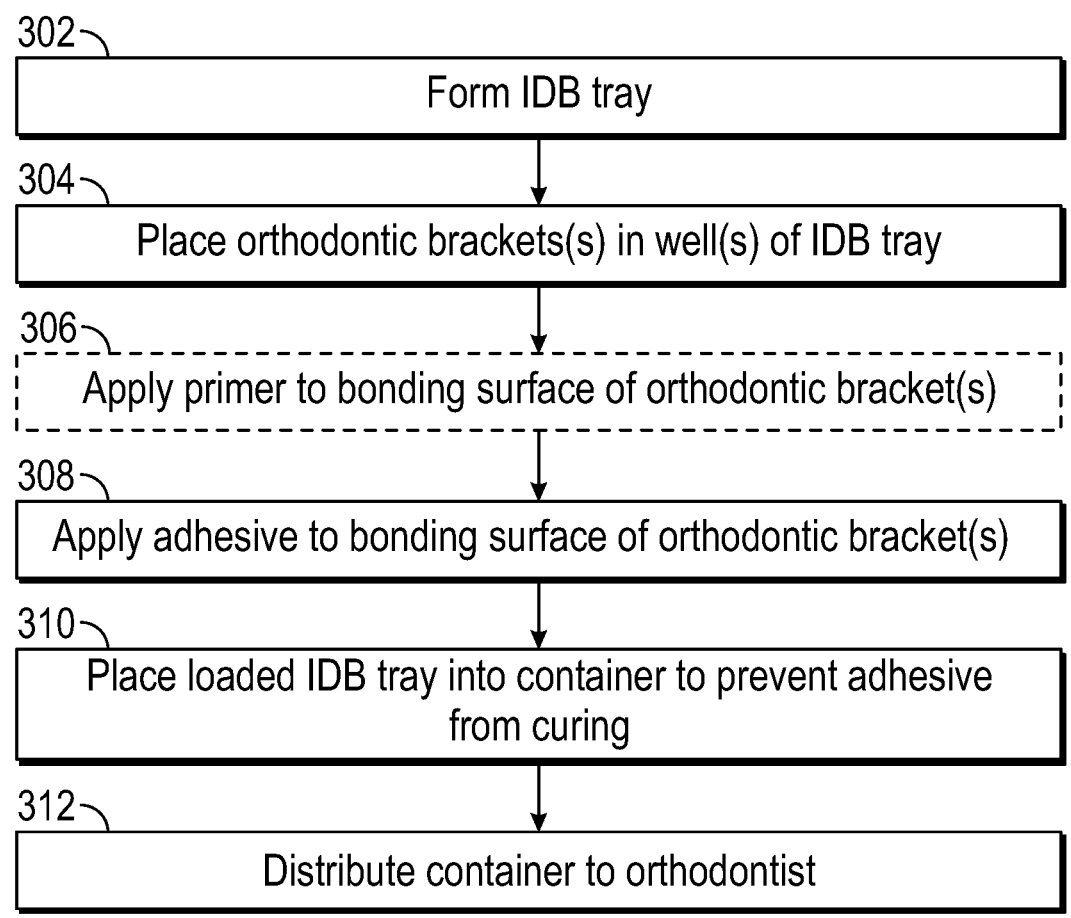
FIG. 3 illustrates a method of producing a preloaded IDB tray for distribution.

FIG. 3 illustrates a method 300 of producing a preloaded IDB tray. The flow diagram is provided for the purpose of facilitating description of aspects of some embodiments. The diagram does not attempt to illustrate all aspects of the disclosures and should not be considered limiting. In some variants, some of the steps described in reference to method 300 may be omitted.

At block 302, an IDB tray manufacturer can form an IDB tray 100. As described herein, the IDB tray 100 can be formed for a patient's dental arch (e.g., section of or entire dental arch). The IDB tray 100 can be custom formed based on digital data from images (e.g., scans) of a patient's teeth which can be captured via using a variety of techniques, which can include a digital intra-oral scanner, a cone-beam computed tomography (CBCT) X-ray scanner, and/or others. In some variants, the patient may capture images of the patient's own teeth with a portable device (e.g., smartphone, tablet, laptop, desktop, and/or a device connected to one or more of the foregoing).

The IDB tray 100 can be formed via a variety of techniques. In some variants, the IDB tray 100 can be 3-D printed. The IDB tray 100 can be 3-D printed with a variety of materials, which can include one or more resins. In some variants, the IDB tray 100 can be formed via molding over a 3D model of a patient's dental arch with features (e.g., functional or non-functional brackets) positioned to create wells to receive the brackets that will be transferred to the patient's teeth. In some variants, the IDB tray 100 can be formed using a soluble material, as described herein. The IDB tray 100 can be formed with one or wells to receive one or more orthodontic brackets to transfer the one or more orthodontic brackets to a patient's teeth. As described herein, the IDB tray 100 can be formed with wells and/or a channel or slot to receive bite turbos, auxiliaries, temporary anchoring devices, an archform, buttons, etc. to be transferred to the teeth of a patient.

At block 304, the IDB tray manufacturer can place an orthodontic bracket in the one or more wells of the IDB tray 100. The orthodontic brackets can be placed into the wells with a bonding surface facing out of the well. The bonding surface, as described herein, can include one or more features to improve bonding to a tooth using an adhesive. In some variants, the IDB tray 100 can include one or more features to help retain the orthodontic brackets in the wells until placement on a patient's teeth. In some variants, an archform (e.g., archwire) can be loaded into a channel or slot in the IDB tray 100 before the orthodontic brackets are placed in the wells. When the orthodontic brackets are placed in the wells, the orthodontic brackets can couple with the archform. In some variants, the orthodontic brackets may include springs to secure the orthodontic brackets to the archform.

At block 306, the IDB tray manufacturer can optionally apply a primer to the bonding surfaces of the orthodontic brackets placed in the one or more wells of the IDB tray 100. The primer can improve adhesion of the adhesive to the bonding surface of the orthodontic brackets. The IDB tray manufacturer can elect the type and quantity of primer and ensure proper application.

At block 308, the IDB tray manufacturer can apply an adhesive to the bonding surfaces of the orthodontic brackets. When primer is applied to the bonding surfaces, the IDB tray manufacturer can apply the adhesive to the primer. In some variants, the primer can be cured before application of an adhesive. The IDB tray manufacturer can elect the type and quantity of adhesive and ensure proper application.

At block 310, the IDB tray manufacturer can place the loaded IDB tray with the preloaded brackets with pre-pasted uncured adhesive into a container. The container can help to prevent the adhesive from curing during shipping. In some variants, the container can be airtight to prevent the adhesive from curing or slow the curing of the adhesive. In some variants, the container can be opaque to reduce and/or prevent the transmission of light through the container to prevent the adhesive from curing or slow the curing of the adhesive. In some variants, the container can be thermally insulated to prevent the adhesive from curing or slow the curing of the adhesive.

At block 312, the IDB tray manufacturer can distribute the container with the loaded IDB tray to the orthodontist, which can include providing the container to a distributor.

The orthodontist can receive the container with the loaded IDB tray. In some variants, the orthodontist can leave the loaded IDB tray in the container until a patient is ready for treatment to prevent the adhesive from curing or slow curing. In some variants, the orthodontists can remove the loaded IDB tray from the container and place the loaded IDB tray into a controlled environment that will prevent the adhesive from curing or slow curing. When a patient is ready for treatment, the orthodontists can remove the IDB tray from the container and/or controlled environment and place the loaded IDB tray over the dental arch of the patient. The adhesive can bond the bonding surfaces of the orthodontic brackets to the patient's teeth. The IDB tray can be removed from the patient's dental arch. An archform can be coupled to the orthodontic brackets to move the patient's teeth using sliding or non-sliding mechanics. As described herein, in some variants, the archform can be transferred with the orthodontic brackets by way of the IDB tray to the teeth of the patient. As described herein, in some variants, bite turbos, auxiliaries, temporary anchoring devices, buttons, etc. can be transferred with the IDB tray, which can include being transferred with one or more orthodontic brackets and/or archform.

The IDB tray manufacturer, in some variants, can supply a kit and/or system to orthodontists. For example, in some variants, a kit and/or system can include a preloaded IDB tray (e.g., an IDB tray with preloaded brackets with uncured pre-pasted adhesive), one or more archforms (e.g., two, three, four, or more), a tool for handling and/or installing archforms, primer, and/or an adhesive (e.g., bonding agent) for attaching the plurality of brackets to the teeth of the patient in the event that more is needed. In some variants, the kit and/or system can include the components to install an orthodontic appliance (e.g., brackets and archform) in the mouth of the patient. In some variants, one archform can be loaded in the IDB tray and coupled to the preloaded brackets.

Figure 4:
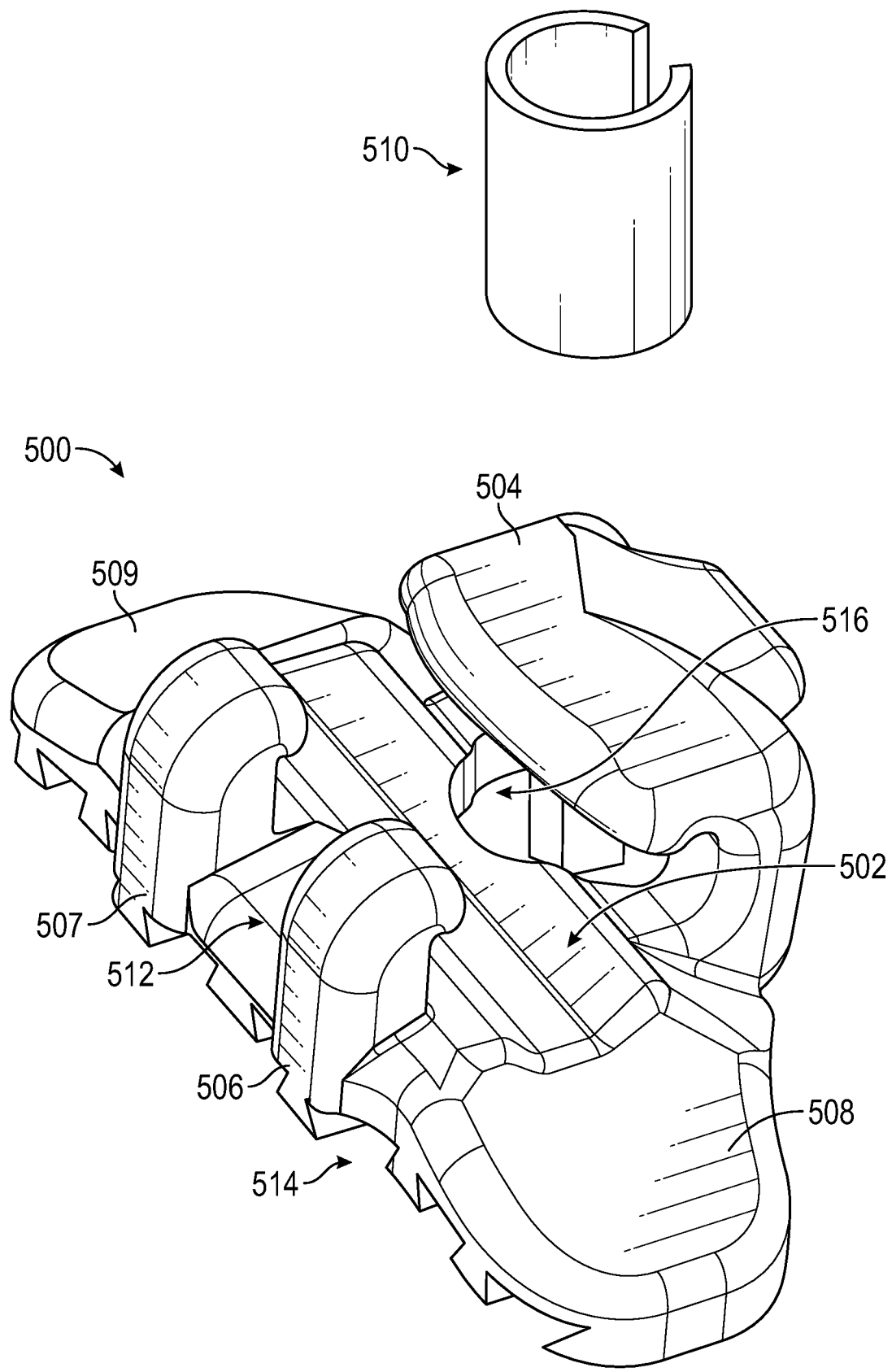
FIG. 4 illustrates an orthodontic bracket with a spring removed.

FIG. 4 illustrates an example orthodontic bracket 500. The orthodontic bracket 500 can be transferred to a tooth of a patient with the IDB trays described herein. For example, the orthodontic bracket 500 can be placed in a well of an IDB tray. Primer and/or adhesive can be applied to a contact or bonding surface facing out of the well.

As shown, the bracket 500 can include lateral extensions or wings 508, 509 that extend in the medial-distal direction when the bracket 500 is bonded to a tooth. In some variants, the bracket 500 may not include lateral extensions or wings 508, 509. The lateral extensions or wings 508, 509 can improve rotational control of a tooth.

The bracket 500 can include a contact or bonding surface 514 that is configured to be bonded to the surface of a tooth of the patient. Accordingly, primer and/or adhesive can be applied to the contact or bonding surface 514 to facilitate bonding to a surface (e.g., lingual or buccal) of a tooth of the patient. The contact or bonding surface 514 can include grooves, slots, etc. that can receive primer and/or adhesive. As illustrated, the lateral extensions 508, 509 increase the size of the contact surface 514, which can further increase the strength of the bond between the bracket 500 and the surface of the tooth. The bonding surface 514 can be exposed when the orthodontic brackets are disposed in the wells of the IDB tray, which can facilitate the bonding surfaces 514 being bonded, respectively, to the surfaces of the teeth of the patient during curing.

The bracket 500 can include a variety of features that facilitate coupling to an archform. The bracket 500 can include a slot 502, which can extend in the medial-distal direction, disposed between a retainer 504 and stops 506, 507. The slot 502 can receive a bracket connector of an archform therein such that the archform does not slide with respect to the bracket 500. The retainer 504 and the stops 506, 507 can at least prevent movement of the bracket connector relative to the bracket 500 in the gingival-occlusal direction. The bracket 500 can include a spring 510 (e.g., C-spring) that can lock the bracket connector within the slot 502. The spring 510 can be disposed in the retainer 504 and push the connector against the stops 506, 507 to lock the connector within the slot 502. The spring 510 can be disposed in a hole or cavity 516 of the bracket 500. In some variants, the bracket 500 does not include a spring 510. A gap 512 can space apart the stops 506, 507 and receive a portion of the bracket connector therein such that the stops 506, 507 impede medial-distal movement of the bracket connector relative to the bracket 500.

Figure 5A:
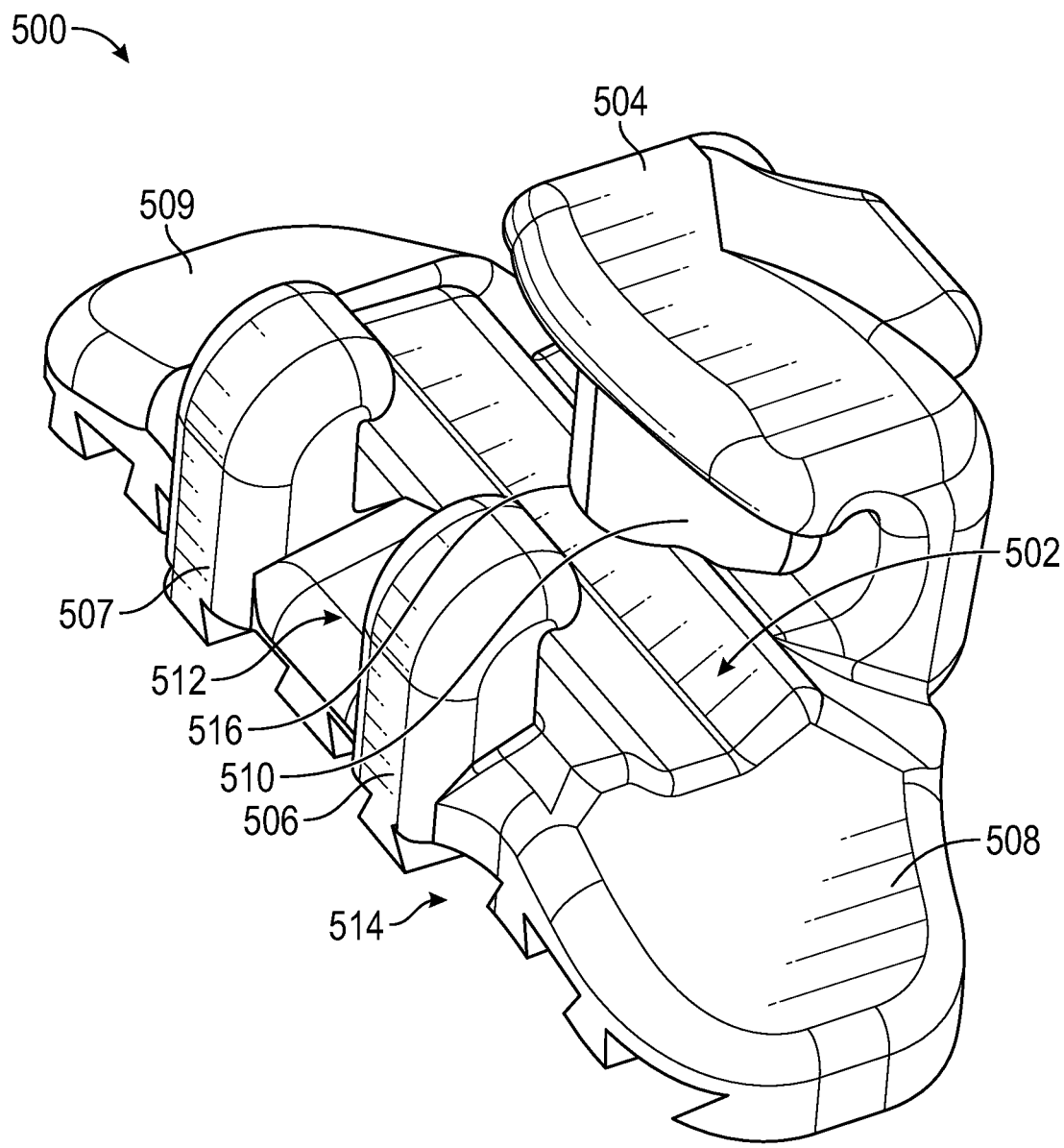
FIGS. 5A and 5B illustrate various views of the orthodontic bracket with the spring disposed in the orthodontic bracket.
Figure 5B:
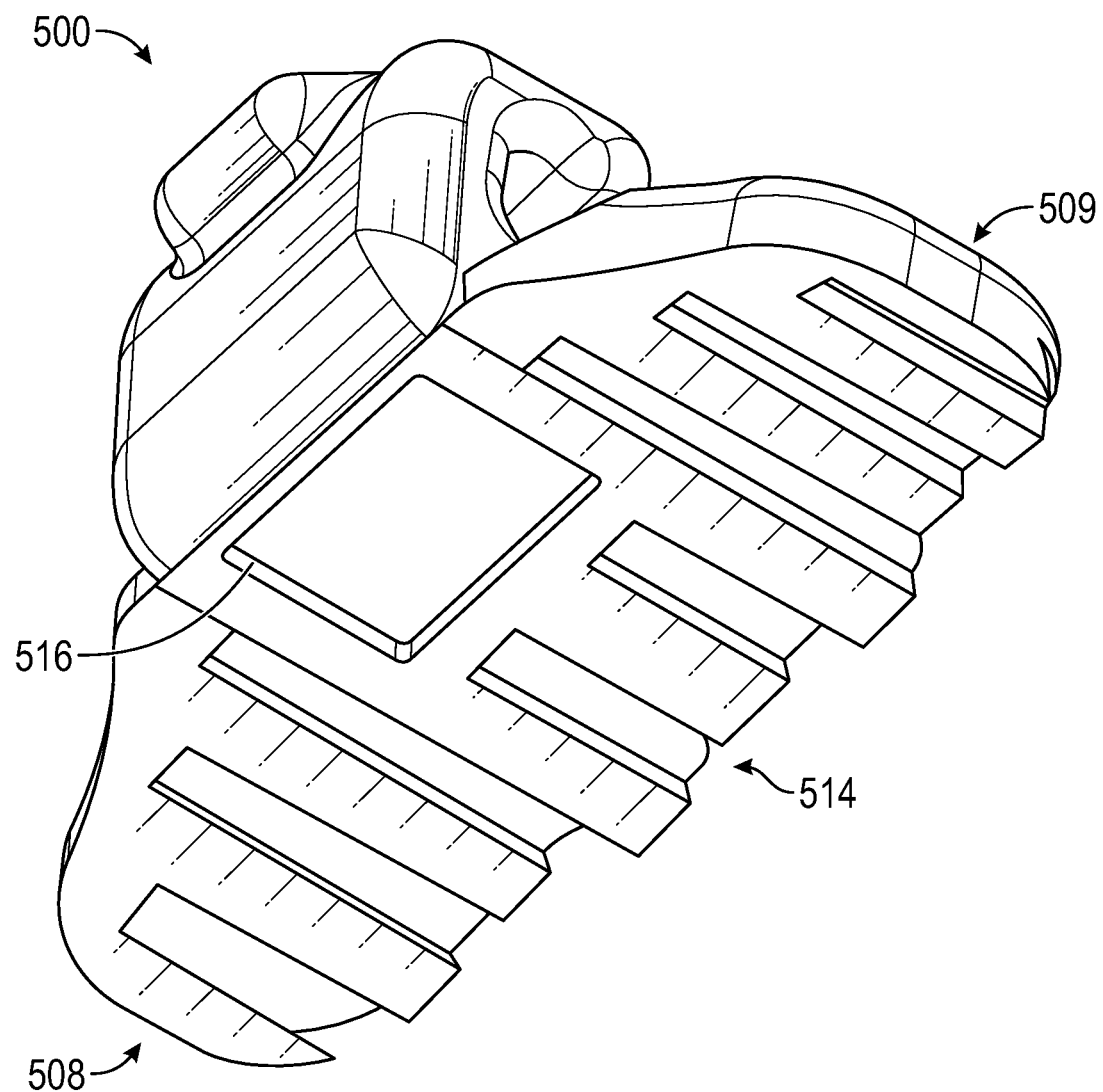

FIGS. 5A and 5B illustrate the bracket 500 with the spring 510 disposed in the hole or cavity 516.

Figure 6:
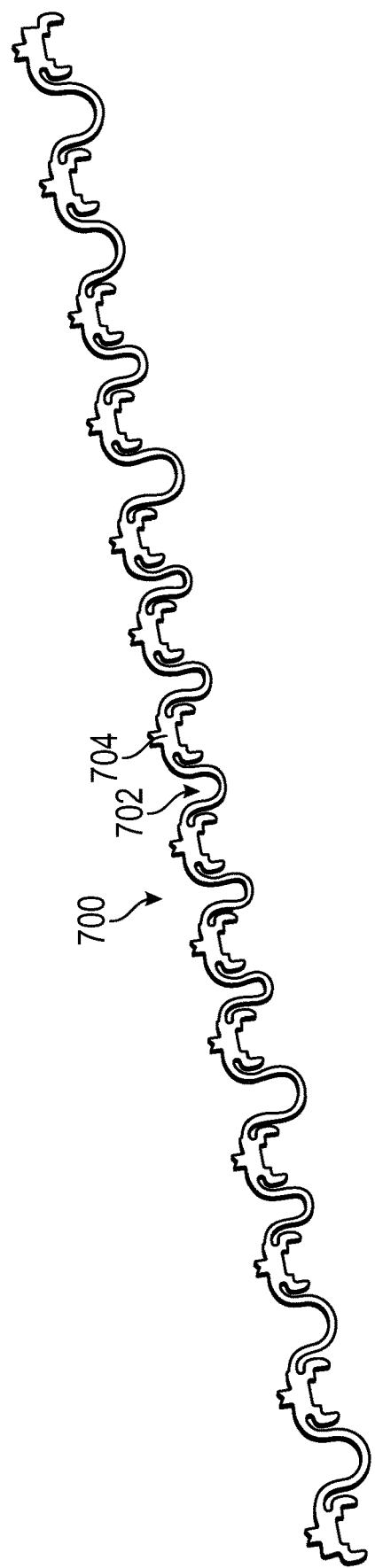
FIG. 6 illustrates an archform.

FIG. 6 illustrates an example archform 700, which can also be referred to as an archwire. In some variants, the archform 700 can be transferred, via an IDB tray, to couple with orthodontic brackets bonded to the patients teeth. In some variants, the archform 700 can be disposed in an IDB tray and coupled with orthodontic brackets disposed in the IDB tray to transfer orthodontic brackets and the archform 700 together to the teeth of a patient.

The archform 700 can have a polygonal (e.g., square, rectangular), circular, and/or other shaped cross-section. The archform 700 can be cut from a sheet of material, such as shape memory material (e.g., nickel titanium). The archform 700 can include a plurality of bracket connectors or connector portions 704 that can be coupled to orthodontic brackets to install the archform 700 in the mouth of a patient. The connectors 704 can include one or more features (e.g., tongue, arms, etc.) to facilitate locking the connectors 704 within an orthodontic bracket.

The archform 700 can include a plurality of interproximal segments 702. The interproximal segments 702 can be disposed between adjacent connectors 204. The interproximal segment 702 can include loops. The loops can extend in a gingival direction when the archform 200 is installed in the mouth, which can improve aesthetics and/or facilitate flossing. The loops can open to move adjacent teeth apart from each other. The loops can close to move adjacent teeth closer together.

As shown, the archform 700 is a two-dimensional shape. The archform 700 can be set in a custom nonplanar shape using a fixture based on a digital model of a patient's teeth in second positions, which may be an expected final alignment of the teeth. The archform 700 can be held in the custom nonplanar shape by the fixture and set by exposure to heat such that the custom nonplanar shape is the default or memorized position of the archform 700. The archform 700 can follow the entire upper or lower dental arch of a patient or a segment thereof. The archform 700 can be deflected from the memorized custom nonplanar shape and coupled to orthodontic brackets (e.g., coupling the connectors 704 to orthodontic brackets). The archform 700 can exert forces on the brackets and/or directly on the patient's teeth, causing the teeth to move toward second positions (e.g., an expected planned alignment) planned in the digital model.

Figure 7:
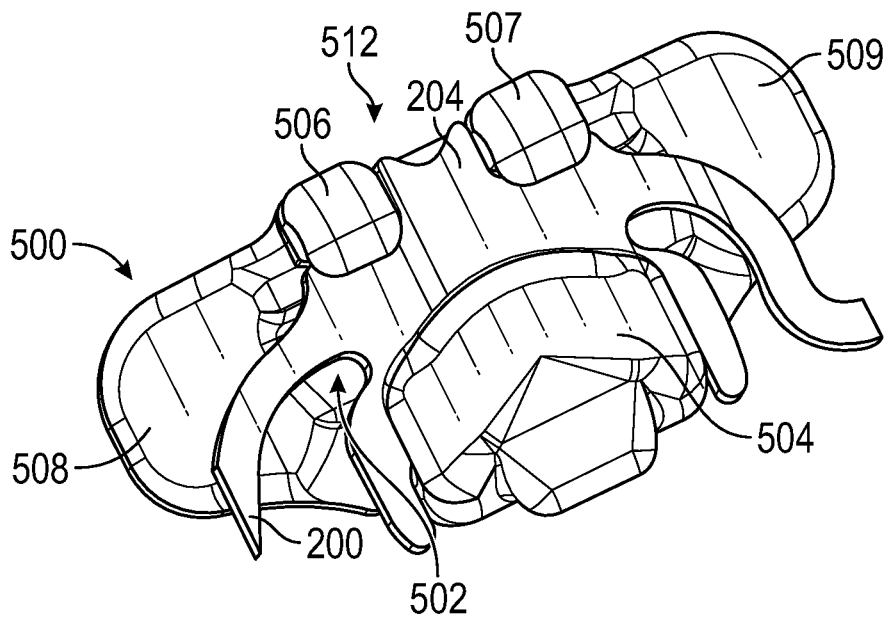
FIG. 7 illustrate the archform coupled with the orthodontic bracket.

FIG. 7 illustrates the bracket 500 with a connector 704 of the archform 700 coupled thereto such that the connector 704 may not slide with respect to the bracket 500. The bracket connector 704 can be disposed within the slot 502 of the bracket 500. The stops 506, 507 and retainer 504 can cooperate to retain the bracket connector 704 within the slot and prevent movement of the bracket connector 704 in the occlusal-gingival direction. A portion of the bracket connector 704, e.g., the tongue or tab, can be disposed in the gap 512 between the stops 506, 507 which can help impede the connector 704 from sliding relative to the bracket 500 in the medial-distal direction. As described herein, the spring 510, when incorporated, can push the connector 704 against the stops 506, 507, locking the connector 704 within the bracket 500. In some variants, the connector 704 may be tied to the bracket 500. The bracket 500 can include tie wings.

Figure 8:
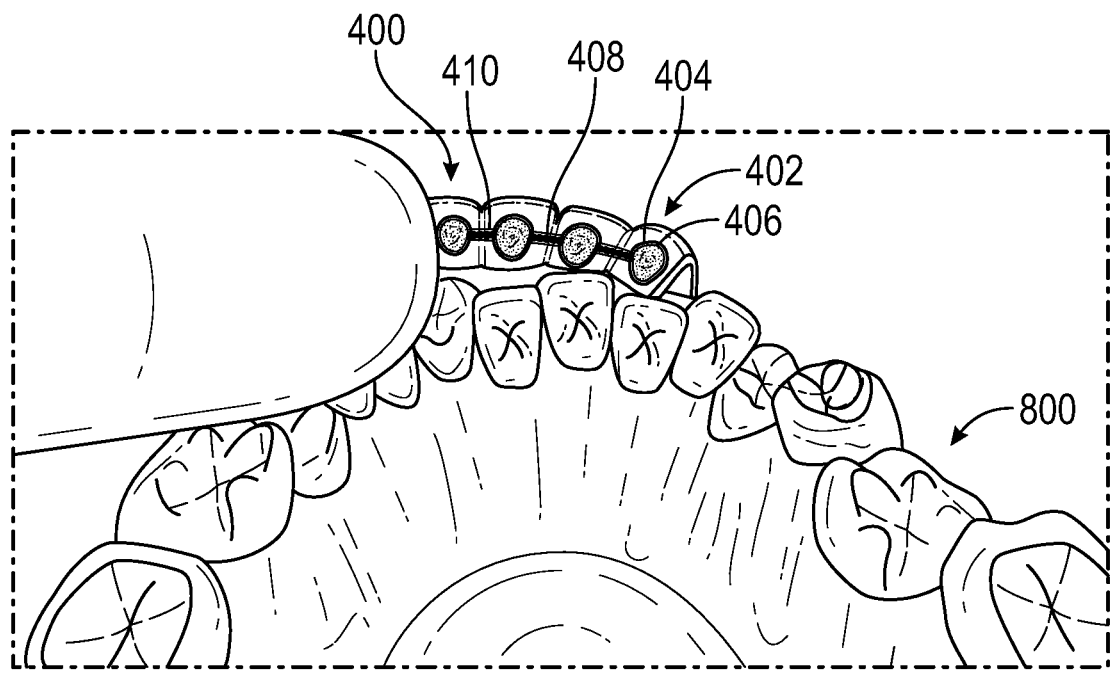
FIG. 8 illustrates an indirect orthodontic bonding (IDB) tray being positioned over a patient's teeth to bond a retainer to the patient's teeth.

FIG. 8 illustrates an indirect orthodontic bonding (IDB) tray 400 being used to transfer a retainer 408 (e.g., permanent retainer) to the teeth 800 of a patient. The IDB tray 400 can be formed using the techniques described herein (e.g., 3D printing, overmolding on a physical model of a patient's teeth, etc.). The IDB tray 400 can correspond to an entire lower or upper dental arch of the patient. The IDB tray 400 can correspond to a section of the lower or upper dental arch of the patient. As illustrated in FIG. 8, the IDB tray 400 corresponds to the anterior section of the lower dental arch of a patient. The IDB tray 400 can include one or more cavities 402 that can receive the teeth of the patient.

The retainer 408 (e.g., permanent retainer) can be bonded to the lingual or buccal surfaces of the patient's teeth to maintain the alignment of the patient's teeth. The retainer 408 can be cut to a length to span the dental arch of the patient or a section of the dental arch. The retainer 408 can be made of a variety of materials, which can include stainless steel wire, lightweight braided stainless steel wire, and/or others. The retainer 408 can be disposed in a channel 410, which can also be referred to as a slot or groove, in the IDB tray 400 when transferring the retainer 408 to the teeth of the patient. The channel 410 can be formed in the walls of the IDB tray 400 that face the buccal or lingual surfaces of the patient's teeth when disposed on the dental arch of the patient. The retainer 408 can be flexible, allowing the retainer 408 to confirm to the contours of the IDB tray 400. In some variants, the retainer 408 can be made of nickel titanium (e.g., Nitinol) and custom-shaped to correspond to the alignment of the patient's teeth. In some variants, the IDB tray 400 does not have a channel 410. The retainer 408 can be disposed against the inner surface of the IDB tray 400 that is positioned proximate the lingual surfaces of the patient's teeth when the IDB tray 400 is positioned on the patient's teeth.

The IDB tray 400 can include one or more wells 404, which can be disposed in the portion (e.g., walls) of the IDB tray 400 forming the cavities 402. The one or more wells 404 can be positioned to be open to the lingual surfaces of the patient's teeth. In some variants, the one or more wells 404 can be positioned to be open to the buccal surfaces of the patient's teeth. The channel 410 can span several of the wells 404 such that the retainer 408, when placed in the channel 410, extends through the wells 404. The one or more wells 404 can receive adhesive 406 or the like therein. The one or more wells 404 can include a contoured profile, which can include rounded, smooth, and/or curved surfaces. The one or more wells 404 can be shaped to form rounded mounds, bumps, beads, or the like with cured adhesive 406 on the surfaces (buccal or lingual) of the patient's teeth. The surfaces of the IDB tray 400 forming the one or more wells 404 can be smooth such that the surfaces of the adhesive 406, once cured, can be smooth to reduce adhesive cleanup for a clinician and/or avoid irritating the soft tissue and/or tongue of the patient. The adhesive 406, once cured, can bond the retainer 408 to the surfaces of the patient's teeth. The adhesive 406 can cure from exposure to light (e.g., UV light), air, temperature (high or low), chemicals, and/or other influences. The adhesive 406 can be clear or colored. In some variants, the IDB tray 400 does not have a channel 410 and the retainer 408 is disposed against the inner surface of the IDB tray 400 that is positioned proximate the lingual surfaces of the patient's teeth when the IDB tray 400 is positioned on the patient's teeth and the retainer 408 is disposed through the adhesive 406 in the wells 404.

Figure 9:
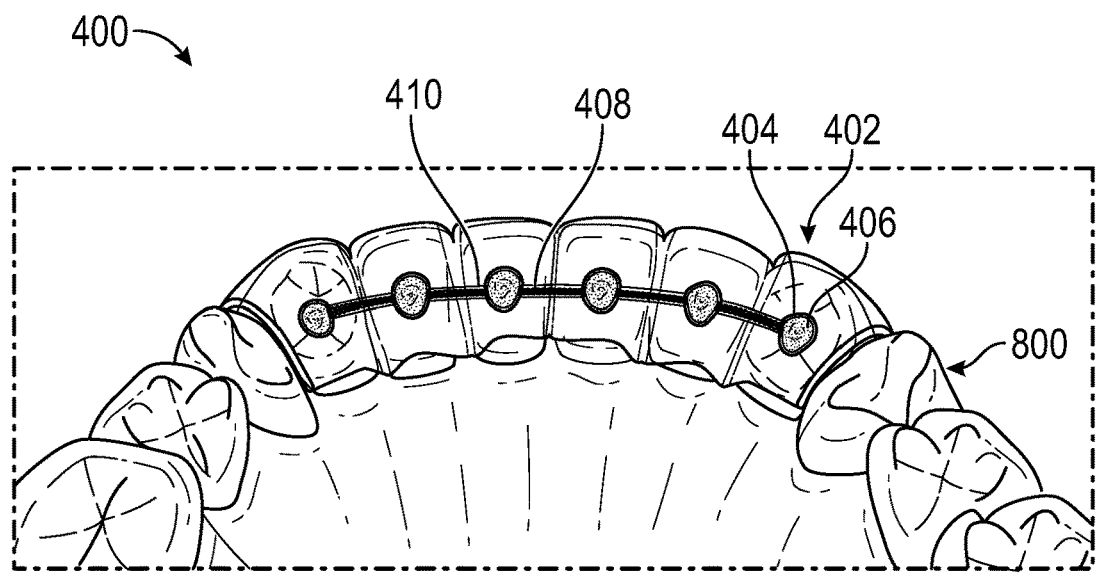
FIG. 9 illustrates the IDB tray disposed over the patient's teeth.

FIG. 9 illustrates the IDB tray 400 disposed over the anterior teeth of the lower dental arch of the patient. The adhesive 406 can contact the lingual surfaces of the patient's teeth and cure, bonding the retainer 408 to the lingual surfaces of the patient's teeth. As described herein, the adhesive can be cured from exposure to light (e.g., UV light), air, temperature (high or low), chemicals, and/or other influences. In some variants, the adhesive 406 can be cured while covered by the IDB tray 400. In some variants, the adhesive 406 can be cured while covered and/or with the IDB tray 400 removed.

Figure 10:
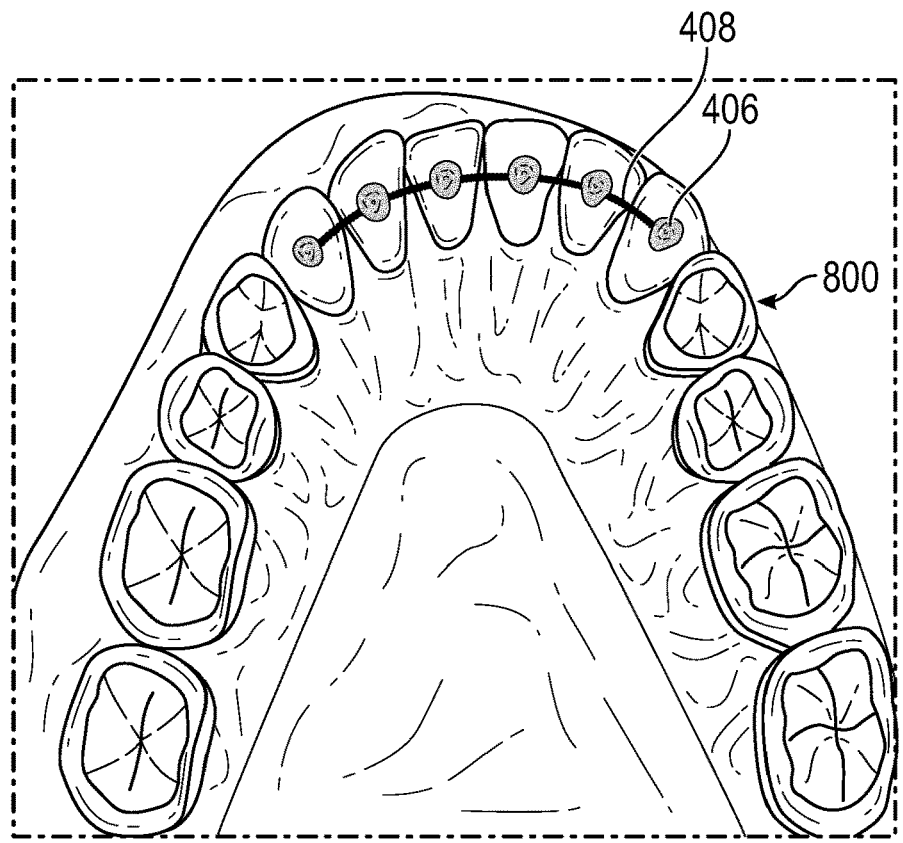
FIG. 10 illustrates the retainer bonded to the patient's teeth with adhesive mounds.

FIG. 10 illustrates the retainer 408 bonded to the lingual surfaces of the patient's teeth by way of the beads of cured adhesive 406. As described herein, the retainer 408 can be flexible when placed into the IDB tray 400, enabling the retainer 408 to conform to the contours of the IDB tray 400. When the adhesive 406 cures and bonds the retainer 408 onto the surfaces of the patient's teeth, the length of the portions of the retainer 408 between adjacent cured adhesive beads 406 can be sufficiently short such that the portions of the retainer 408 are stiff (e.g., rigid) and prevent movement of the patient's teeth. Accordingly, the portions of the retainer 408 between adjacent beads of adhesive 406 can be stiff (e.g., rigid), as well as the portions of the retainer 408 disposed in the adhesive.

Figure 11:
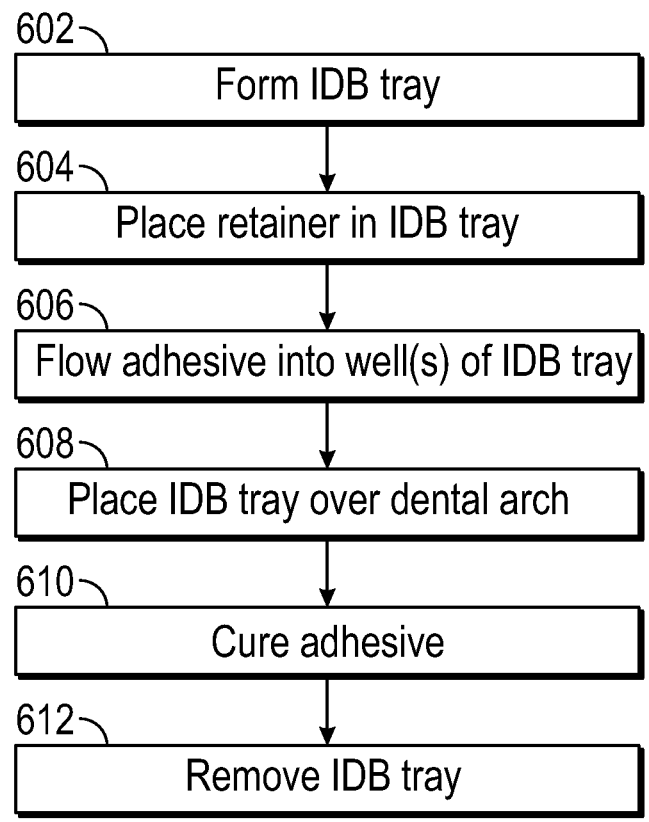
FIG. 11 illustrates a method of installing a retainer in the patient's mouth with the IDB tray.

FIG. 11 illustrates a method 600 of installing a retainer on a patient's teeth. The flow diagram is provided for the purpose of facilitating description of aspects of some embodiments. The diagram does not attempt to illustrate all aspects of the disclosures and should not be considered limiting. In some variants, some of the steps described in reference to method 600 may be omitted.

At block 602, an IDB tray manufacturer can form an IDB tray 400. As described herein, the IDB tray 400 can be formed for a patient's dental arch (e.g., section of or entire upper or lower dental arch). The IDB tray 400 can be custom formed based on digital data from images (e.g., scans) of a patient's teeth, which can be captured via using a variety of techniques, which can include a digital intra-oral scanner, a cone-beam computed tomography (CBCT) X-ray scanner, and/or others. In some variants, the patient may capture images of the patient's own teeth with a portable device (e.g., smartphone, tablet, laptop, desktop, and/or a device connected to one or more of the foregoing). The IDB tray 400 can include one or more wells 404 to receive adhesive as described herein. The IDB tray 400 can include a channel 410 to receive a retainer 408 as described herein.

The IDB tray 400 can be formed via a variety of techniques. In some variants, the IDB tray 400 can be 3-D printed. The IDB tray 400 can be 3-D printed with a variety of materials, which can include one or more resins. In some variants, the IDB tray 400 can be formed via molding over a 3D model of a patient's dental arch with features (e.g., mounds, bumps, ridges, protrusions, etc.) thereon to form the wells 404 and channel 410. In some variants, the IDB tray 400 can be formed without a channel 410. In some variants, the IDB tray 400 can be formed using a soluble material, as described herein.

At block 604, the retainer 408 can be disposed in the IDB tray 400. In some variants, the retainer 408 can be disposed in the channel 410 of the IDB tray 400. In some variants, the IDB manufacturer or clinician can cut the retainer 408 to a length corresponding to the portion of the dental arch to be retained. The IDB manufacturer or clinician can place the retainer 408 in the channel 410. In some variants, the IDB tray manufacturer can ship the IDB tray 400 with the retainer 408 loaded therein to the clinician. As described herein, the retainer can be flexible and conform to the surfaces of the IDB tray 400.

At block 606, adhesive 406 can be flowed (e.g., disposed) into the wells 404. In some variants, adhesive 406 can be flowed into the wells 404 by a clinician immediately before placing the IDB tray 400 on the patient's dental arch. In some variants, adhesive 406 can be flowed into the wells 404 by the IDB tray manufacturer and the loaded IDB tray 400 can be shipped to the clinician in a container that prevents or slows the curing of the adhesive 406, as described herein. The adhesive 406 can flow around the portions of the retainer 408 extending through the wells 404.

At block 608, the IDB tray 400 with the adhesive 406 and retainer 408 can be placed over the lower or upper dental arch or a portion thereof of the patient. The adhesive 406 can contact the surfaces (buccal or lingual) of the patient's teeth.

At block 610, the adhesive 406 can be cured to bond the retainer 408 to the surfaces (lingual or buccal) of the patient's teeth. The adhesive 406 can be cured via a variety of techniques, which can at least include exposure to light (e.g., UV light), air, temperature (high or low), chemicals, and/or other influences. Due to the shape of the wells 404, the cured adhesive 406 can form beads, mounds, or the like on the surfaces of the patient's teeth. The cured adhesive 406 can have contours that are smooth and/or curved to reduce irritation to the tongue and/or tissue of the patient. In some variants, the walls of the IDB tray 400 forming the wells 404 can be smooth such that the cured adhesive 406 has smooth surfaces.

At block 612, the IDB tray 400 can be removed from the dental arch of the patient. In some variants, the adhesive 406 can be cured, in addition to the curing performed at block 610, after removal of the IDB tray 400. In some variants, the IDB tray 400 is removed before curing at block 610.

In some variants, the IDB tray 400 loaded with a retainer 408 or a retainer 408 and adhesive 406 can be incorporated into a kit, which can be distributed to a clinician.

It is intended that the scope of this present invention herein disclosed should not be limited by the particular disclosed embodiments described above. This invention is susceptible to various modifications and alternative forms, and specific examples have been shown in the drawings and are herein described in detail. This invention is not limited to the detailed forms or methods disclosed, but rather covers all equivalents, modifications, and alternatives falling within the scope and spirit of the various embodiments described and the appended claims.

Various other modifications, adaptations, and alternative designs are of course possible in light of the above teachings. Therefore, it should be understood at this time that within the scope of the appended claims the invention may be practiced otherwise than as specifically described herein. It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. For example, actions such as "tying a tie onto an orthodontic bracket" includes "instructing the tying of a tie onto an orthodontic bracket." The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

What is claimed is:

1. A kit comprising:
    a preloaded indirect orthodontic bonding (IDB) tray comprising:
        an IDB tray with a plurality of wells and a channel;
        a plurality of orthodontic brackets placed within the plurality of wells, each of the plurality of orthodontic brackets comprising a slot, a spring disposed in the slot, one or more stops, and a bonding surface, wherein the bonding surfaces are facing out of the plurality of wells;
        an archform disposed in the channel, the archform comprising a plurality of bracket connectors and a plurality of interproximal loops disposed between adjacent bracket connectors of the plurality of bracket connectors, the plurality of bracket connectors disposed in the slots of the plurality of orthodontic brackets such that the springs are deflected to push the plurality of bracket connectors in an occlusal-gingival direction against the one or more stops of the plurality of orthodontic brackets to lock the plurality of bracket connectors to the plurality of orthodontic brackets; and
        an adhesive applied onto the bonding surfaces of the plurality of orthodontic brackets;
    a container for housing the preloaded IDB tray, the container configured to prevent the adhesive from curing.

2. The kit of claim 1, wherein the preloaded IDB tray further comprises a primer applied to the bonding surfaces of the plurality of orthodontic brackets.

3. The kit of claim 1, wherein the IDB tray is in separate segments corresponding to portions of a patient's dental arch.

4. A method of producing a loaded indirect orthodontic bonding (IDB) tray for distribution, the method comprising:
    forming an indirect orthodontic bonding (IDB) tray with a plurality of wells and a channel;
    placing an archform in the channel of the IDB tray, the archform comprising a plurality of bracket connectors and a plurality of interproximal loops disposed between adjacent bracket connectors of the plurality of bracket connectors;
    placing a plurality of orthodontic brackets into the plurality of wells such that bonding surfaces of the plurality of orthodontic brackets are facing out of the plurality of wells and the plurality of bracket connectors are disposed in slots of the plurality of orthodontic brackets such that springs disposed in the slots of the plurality of orthodontic brackets are deflected to push the plurality of bracket connectors in an occlusal-gingival direction against one or more stops of the plurality of orthodontic brackets to lock the plurality of bracket connectors to the plurality of orthodontic brackets;
    applying an adhesive to the bonding surfaces of the plurality of orthodontic brackets; and
    placing the IDB tray loaded with the archform, the plurality of orthodontic brackets, and pre-pasted adhesive into a container for distribution, the container configured to prevent the adhesive from curing.

5. The method of claim 4, further comprising applying a primer to the bonding surfaces of the plurality of orthodontic brackets.

6. The method of claim 4, wherein forming the IDB tray with the plurality of wells comprises 3D printing the IDB tray based on a digital model of at least a portion of a patient's dental arch.

7. The method of claim 4, wherein forming the IDB tray with the plurality of wells comprises molding over a 3D model of a patient's dental arch with a plurality of features positioned to form the plurality of wells.

8. A preloaded indirect orthodontic bonding (IDB) tray for distribution, the preloaded IDB tray comprising:
 an indirect bonding tray (IDB) tray with a plurality of wells and a channel;
 a plurality of orthodontic brackets placed within the plurality of wells, each of the plurality of orthodontic brackets comprising a slot, a spring disposed in the slot, one or more stops, and a bonding surface, wherein the bonding surfaces are facing out of the plurality of wells;
 an archform disposed in the channel, the archform comprising a plurality of bracket connectors and a plurality of interproximal loops disposed between adjacent bracket connectors of the plurality of bracket connectors, the plurality of bracket connectors disposed in the slots of the plurality of orthodontic brackets such that the springs are deflected to push the plurality of bracket connectors in an occlusal-gingival direction against the one or more stops of the plurality of orthodontic brackets to lock the plurality of bracket connectors to the plurality of orthodontic brackets;
 a primer applied to the bonding surfaces of the plurality of orthodontic brackets; and
 an adhesive pasted onto the bonding surfaces of the plurality of orthodontic brackets.

9. The preloaded IDB tray of claim 8, wherein the preloaded IDB tray is configured to be distributed to an orthodontist in a container that is configured to prevent the adhesive from curing such that the preloaded IDB tray is ready for placement on a dental arch of a patient upon receipt by the orthodontist.

10. The method of claim 4, wherein the IDB tray comprises a soluble material configured to dissolve in a patient's mouth, and wherein the soluble material is cellulose.

11. The kit of claim 1, wherein the IDB tray comprises a soluble material configured to dissolve in a patient's mouth.

12. The preloaded IDB tray of claim 8, wherein the IDB tray comprises a soluble material configured to dissolve in a patient's mouth.

* * * * *